United States Patent
Gunderson et al.

(10) Patent No.: US 7,600,198 B2
(45) Date of Patent: Oct. 6, 2009

(54) METHOD OF TRACKING DATA OBJECTS USING RELATED THUMBNAILS IN A PALETTE WINDOW

(75) Inventors: Benjamin Gunderson, Simi Valley, CA (US); Peter Noyes, Pasadena, CA (US)

(73) Assignee: Bluebeam Software, Inc., Pasadena, CA (US)

( * ) Notice: Subject to any disclaimer, the term of this patent is extended or adjusted under 35 U.S.C. 154(b) by 291 days.

(21) Appl. No.: 11/287,410

(22) Filed: Nov. 23, 2005

(65) Prior Publication Data

US 2007/0118818 A1    May 24, 2007

(51) Int. Cl.
*G06F 3/048*    (2006.01)
*G06F 17/00*    (2006.01)

(52) U.S. Cl. .................. 715/838; 715/781; 715/770; 715/211; 707/100

(58) Field of Classification Search ............... 715/838, 715/724, 237, 255, 770, 781, 211; 707/100
See application file for complete search history.

(56) References Cited

U.S. PATENT DOCUMENTS

| | | | |
|---|---|---|---|
| 5,157,763 A | 10/1992 | Peters et al. | |
| 5,276,795 A | 1/1994 | Hoeber et al. | |
| 5,404,442 A | 4/1995 | Foster et al. | |
| 5,414,806 A | 5/1995 | Richards | |
| 5,420,976 A | 5/1995 | Schell et al. | |
| 5,559,942 A | 9/1996 | Gough et al. | |
| 5,579,466 A | 11/1996 | Habib et al. | |
| 5,630,080 A | 5/1997 | Malamud et al. | |
| 5,664,128 A | 9/1997 | Bauer | |
| 5,715,413 A | 2/1998 | Ishai et al. | |
| 5,764,873 A | 6/1998 | Magid et al. | |
| 5,913,063 A | 6/1999 | McGurrin et al. | |
| 6,177,935 B1 | 1/2001 | Munn | |
| 6,232,972 B1 | 5/2001 | Arcuri et al. | |
| 6,366,294 B1* | 4/2002 | Cunningham et al. | ....... 345/666 |
| 6,426,761 B1* | 7/2002 | Kanevsky et al. | ........... 715/788 |
| 6,456,307 B1* | 9/2002 | Bates et al. | ................. 715/838 |
| 6,509,912 B1 | 1/2003 | Moran et al. | |
| 6,693,652 B1 | 2/2004 | Barrus et al. | |
| 6,877,138 B2 | 4/2005 | Fitzpatrick et al. | |

(Continued)

OTHER PUBLICATIONS

Microsoft® Paint, screenshots 1-4, copyright 2001 (hereinafter "Paint").*

*Primary Examiner*—Ting Zhou
(74) *Attorney, Agent, or Firm*—Stetina Brunda Garred & Brucker

(57) ABSTRACT

A method of tracking data objects is provided in accordance with an aspect of the invention. The method includes the step of storing in a workspace memory a first data object having first data object attributes. The method includes the step of storing in a palette memory the first data object where the first data object attributes do not match all attributes of any pre-existing data object stored in the palette memory. The method includes the step of generating on a workspace window the first data object. The first data object is in accordance with the first data object attributes. The method includes the step of generating on a palette window a first thumbnail. The first thumbnail is a depiction of the first data object scaled to a predetermined size. A method for using a graphical computer application is also providing according to another aspect of the invention.

21 Claims, 16 Drawing Sheets

U.S. PATENT DOCUMENTS

| | | |
|---|---|---|
| 6,931,416 B2 | 8/2005 | Kelley et al. |
| 6,961,907 B1 | 11/2005 | Bailey |
| 7,171,621 B1 * | 1/2007 | Johns et al. ................. 715/724 |
| 7,293,242 B2 * | 11/2007 | Cossey et al. ............... 715/770 |
| 2003/0160824 A1 | 8/2003 | Szumla |
| 2003/0223371 A1 * | 12/2003 | Marilly et al. .............. 370/235 |
| 2004/0150671 A1 * | 8/2004 | Kamiwada et al. .......... 345/782 |
| 2005/0262107 A1 | 11/2005 | Bergstraesser et al. |
| 2006/0005163 A1 | 1/2006 | Huesken et al. |
| 2007/0101297 A1 | 5/2007 | Forstall et al. |

* cited by examiner

METHOD OF TRACKING DATA OBJECTS USING RELATED THUMBNAILS IN A PALETTE WINDOW

CROSS-REFERENCE TO RELATED APPLICATIONS

Not Applicable

STATEMENT RE: FEDERALLY SPONSORED RESEARCH/DEVELOPMENT

Not Applicable

BACKGROUND

1. Technical Field

The present invention relates to tracking of data objects, more particularly, a method of tracking data objects using related thumbnails in a palette window.

2. Description of the Related Art

In graphical computer applications, a "clipboard" function is provided which allows users to cut, copy, and paste selected data from one application to another or within the same application. This function is used extensively because it allows the user to avoid re-entering data already present on the computer. Generally, all types of data, including text, graphics, equations, and tables can be transferred to and from the clipboard. This function is typically provided by the operating system, where applications written for the particular operating system "calls" the applicable programmed procedures relating to the clipboard functionality.

The clipboard function relies upon a reserved area of memory, which stores the copied data. The cut, copy, and paste commands may be invoked by the CTRL-X, CTRL-C, and CTRL-V keystroke sequences, respectively, which will be recognized by those familiar with the MICROSOFT WINDOWS® operating system. Other well-known graphically oriented operating systems provide the same functionality often through similar keystroke sequences. Further, these functions may also be invoked from a drop-down menu. The cut command removes the selected data from the display into the clipboard memory. The copy command copies the selected data from the display into the clipboard memory. The paste command copies the contents of the clipboard memory to an indicated insertion point.

Prior to copying or cutting the data into the clipboard, the data must be selected. The user generally uses the keyboard or the mouse to select the desired data from a screen display. Then, the user invokes either the cut or copy command, and the selected data is transferred into the clipboard memory. As is well understood, data displayed on a computer display can be generally categorized into text data and graphics data. In order to select text data, the user positions an "I-beam" pointer at the beginning of the desired text by maneuvering the mouse, clicks and holds down a mouse button, drags the pointer to the end of the desired text, and releases the mouse button. To select text with the keyboard, the user positions the cursor at the beginning of the desired text, presses the shift key, and uses arrow keys to move to the end of the desired text. Text selected in either of the methods described typically appears on the screen display with a background color different from the background color of the non-selected areas of the text. In order to select graphics data in the form of objects, the user navigates a cursor to the graphic via the mouse, and clicks on the graphic. To select graphics data in the form of objects with the keyboard, the user positions a cursor onto the object using the arrow keys, tab key, or any other key not operative to input text. Selected graphics data usually appear with selection handles on corners or other boundaries of the graphic.

Early examples of clipboard functionality existed in word processing applications where textual data was selected, copied, and pasted according to the methods described above. Thus, repeat information need not be retyped, improving efficiency. However, according to early implementations of the clipboard functionality, only one selection of data could be copied to the clipboard memory. Therefore, multiple sections could not be copied and individually retrieved. Although methods such as those described in U.S. Pat. No. 6,961,907 to Bailey provided the ability to copy multiple segments into a single clipboard, those multiple sections could not be individually retrieved. In order to cure such deficiencies, application programs having a multiple position clipboard have been developed. The clipboard operates as a stack, where the most recent item was stored at the top of the stack. Users have the option of displaying the contents of the clipboard in a window, thus not being limited to pasting the last item stored in the clipboard. The user selects any of the items stored and the item was pasted in a desired location.

This concept was unsatisfactory, however, in that only the most recently used items were accessible, and that if multiple, duplicate items were copied, the duplicates remained in the clipboard. Moreover, it was still necessary for the user to initiate the process of selecting and copying the data through one or more of the methods described above.

Therefore, there is a need in the art for an improved method of tracking and manipulating data objects in comparison to the prior art.

BRIEF SUMMARY

According to an aspect of the present invention, there is provided a method of tracking data objects on a data processing device having an output device. The method includes a step of storing in a workspace memory a first data object having first data object attributes associated therewith. The method further includes a step of storing in a palette memory the first data object where the first data object attributes do not match all attributes of any preexisting data object stored in the palette memory. The method further includes the step of generating on a workspace window the first data object. The first data object is in accordance with the first data object attributes. The method further includes a step of generating on a palette window a first thumbnail. The first thumbnail is a depiction of the first data object scaled to a predetermined size.

According to various embodiments, the first thumbnail may be operative to initiate the generation of the first data object in accordance with the first data object attributes with the first data object being generated on the workspace window. The method may further include a step of generating other thumbnails representative of the preexisting data objects stored in the palette memory. The other thumbnails may be generated on the palette window. The first data object attributes may include a tool type attribute and the attributes of a given preexisting data object may include a tool type attribute. The method further include a step of grouping the first thumbnail and the other thumbnails according to a tool type attribute of the respective ones of data objects stored in the palette memory. The first data object attributes may include a history attribute and the attributes of a given preexisting data object include a history attribute. The history attributes may be based upon a sequence of storing the associated data object in the palette memory in relation to the other data objects stored in the palette memory. The history attributes may be based upon a number of times the associated data object was generated on the workspace window.

In addition, the method may further include a step of generating other thumbnails representative of the preexisting data objects stored in the palette memory with the other thumbnails being generated on the palette window. The method may further include a step of sorting the thumbnails according to the history attribute of the respective ones of the first data object and the preexisting data objects. The method may further include a step of storing in the workspace memory a second data object having second data object attributes. The method may further include a step of storing in the palette memory the second data object where the second data object attributes do not match all of the attributes of any preexisting data object stored in the palette memory. The second data object attributes may be derived from the first data object attributes. The first data object may represent graphical display data, for example. The graphic display data may represent text, a geometric primitive, or a raster image, for examples.

According to another aspect of the present invention, there is provided a method for using a graphical computer application. The method includes a step of placing a first data object on a workspace window. The first data object has attributes associated therewith. The method further includes a step of selecting a first thumbnail. The first thumbnail is generated on a palette window in response to the placement of the first data object on the workspace window and is a scaled representation of the first data object. The attributes of the first data object do not match the attributes of any preexisting data object represented as a thumbnail in the palette window.

According to various embodiments, the selection of the thumbnail may result in a placement in the workspace window a second data object being derived from the first data object attributes. The second data object may be automatically placed in a central region of the workspace window. The method may further include the step of selecting a placement location within the workspace window for a second data object. The second data object may be derived from the first data object attributes. The placement location may be selected by positioning a cursor on the workspace window. The method may further include modifying a second data object derived from the first data object on the workspace window, producing a modified second data object. The method may further include selecting a thumbnail generated on the palette window generated in response to modifying the second data object on the workspace window, wherein the thumbnail is a scaled representation of the modified second data object. The method may further include the steps of modifying the first data object and selecting a modified first thumbnail on the palette window. The modified first thumbnail may be a scaled representation of the modified first data object.

BRIEF DESCRIPTION OF THE DRAWINGS

These and other features and advantages of the various embodiments disclosed herein will be better understood with respect to the following description and drawings, in which like numbers refer to like parts throughout, and in which.

DETAILED DESCRIPTION

The detailed description set forth below in connection with the appended drawings is intended as a description of the presently preferred embodiment of the invention, and is not intended to represent the only form in which the present invention may be constructed or utilized. The description sets forth the functions and the sequence of steps for developing and operating the invention in connection with the illustrated embodiment. It is to be understood, however, that the same or equivalent functions and sequences may be accomplished by different embodiments that are also intended to be encompassed within the spirit and scope of the invention. It is further understood that the use of relational terms such as first and second, and the like are used solely to distinguish one from another entity without necessarily requiring or implying any actual such relationship or order between such entities.

Figure 1:
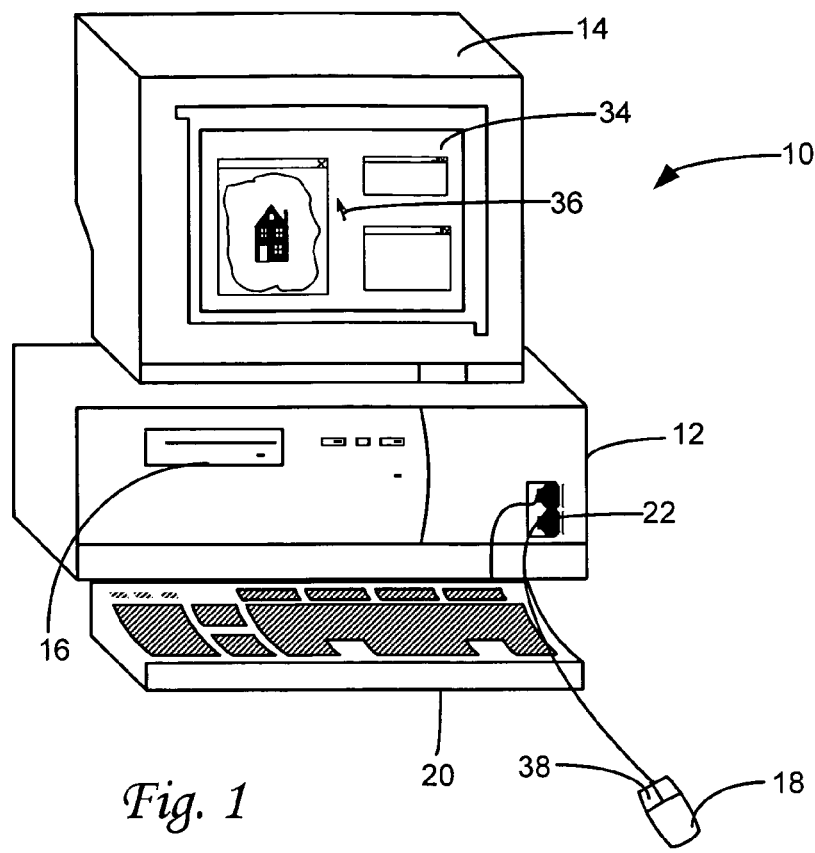
FIG. 1 is a perspective view of an exemplary computer system that may be capable to perform functions for use with aspects of the present invention.

With reference now to FIG. 1, an exemplary hardware environment capable for use with the present invention is shown as an exemplary computer system 10. As shown in FIG. 1, provided is a personal computer 12 with an attached monitor 14 for graphically displaying output from the personal computer 12. The personal computer 12 may also include an optical drive 16, and any number of input devices such as a mouse 18 and a keyboard 20. Further, additional input devices such as a graphical tablet (not shown) may also be attached to the personal computer 12. Typically, such input devices are connected to the personal computer 12 through a USB port 22, however, alternative interconnects such as a PS/2 port or a RS-232 serial port is also contemplated.

Figure 2:
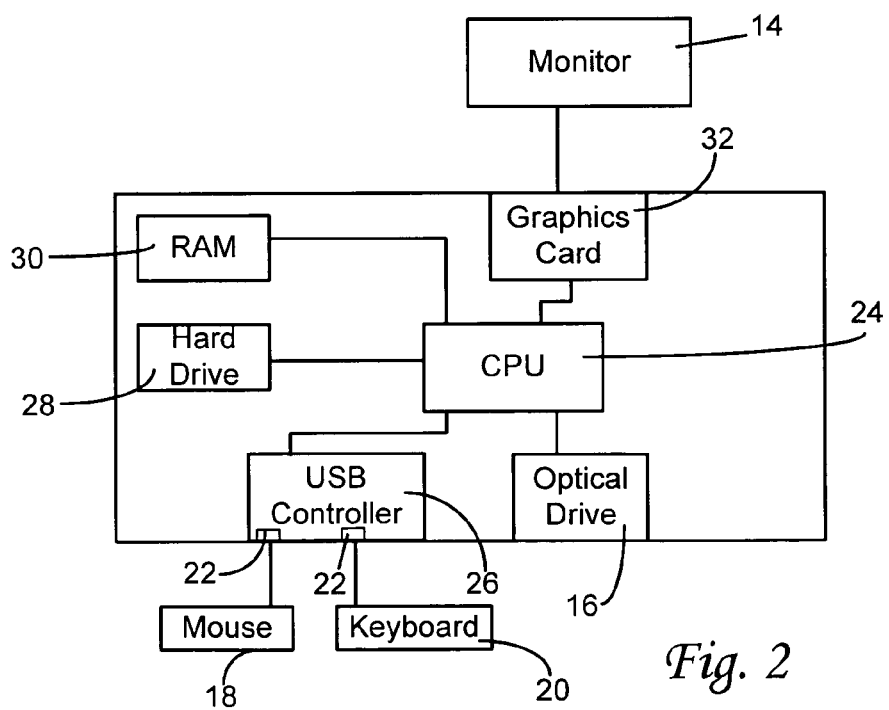
FIG. 2 is a block diagram of system components of the exemplary computer system of FIG. 1.

Further details of the exemplary computer system 10 are shown in FIG. 2 as a block diagram, with the personal computer 12 including a central processing unit (CPU) 24 receiving input from the mouse 18 and the keyboard 20 through the USB port 22. The USB port 22 is connected to a USB controller 26, which processes the signals from the mouse 18 and the keyboard 20 and forms packets of data to be transmitted to the CPU 24. Furthermore, the personal computer 12 includes a hard drive 28 for long term storage of data, a random access memory (RAM) 30 for short term storage of data, and the optical drive 16 for permanent storage or input of data. It will be readily appreciated that the optical drive 16 may be a CD-ROM drive, CD-R drive, CD-RW drive, DVD-ROM drive, and so forth. Output from the CPU 24 is further processed by a graphics card 32, which transmits signals to the monitor 14. The results of the data processing operation as carried out by the CPU 24 are displayed as graphics on the monitor 14. It will be understood that any type of monitor 14, such as a Cathode Ray Tube (CRT), Liquid Crystal Display (LCD) or any other suitable display means may be substituted.

As will be readily appreciated, the computer system 10 may utilize any operating system having a graphical user interface (GUI), such as MICROSOFT WINDOWS®, APPLE MACOS®, UNIX operating systems utilizing X Windows, and so forth. The personal computer 12 executes one or more computer programs 34, which are represented in FIG. 1 by the "windows" or screen interfaces displayed on the monitor 14.

Generally, the operating system and the computer programs 34 are tangibly embodied in a computer-readable medium, e.g. one or more of the fixed and or removable data storage devices including the hard drive 28 or optical media read by the optical drive 16. Both the operating system and the computer programs 34 may be loaded from the aforementioned data storage devices into the RAM 30 for execution by the CPU 24, and comprise instructions which, when read and executed by the CPU 24, causes the personal computer 12 to perform the steps necessary to execute the steps or features of the present invention.

Figure 3:
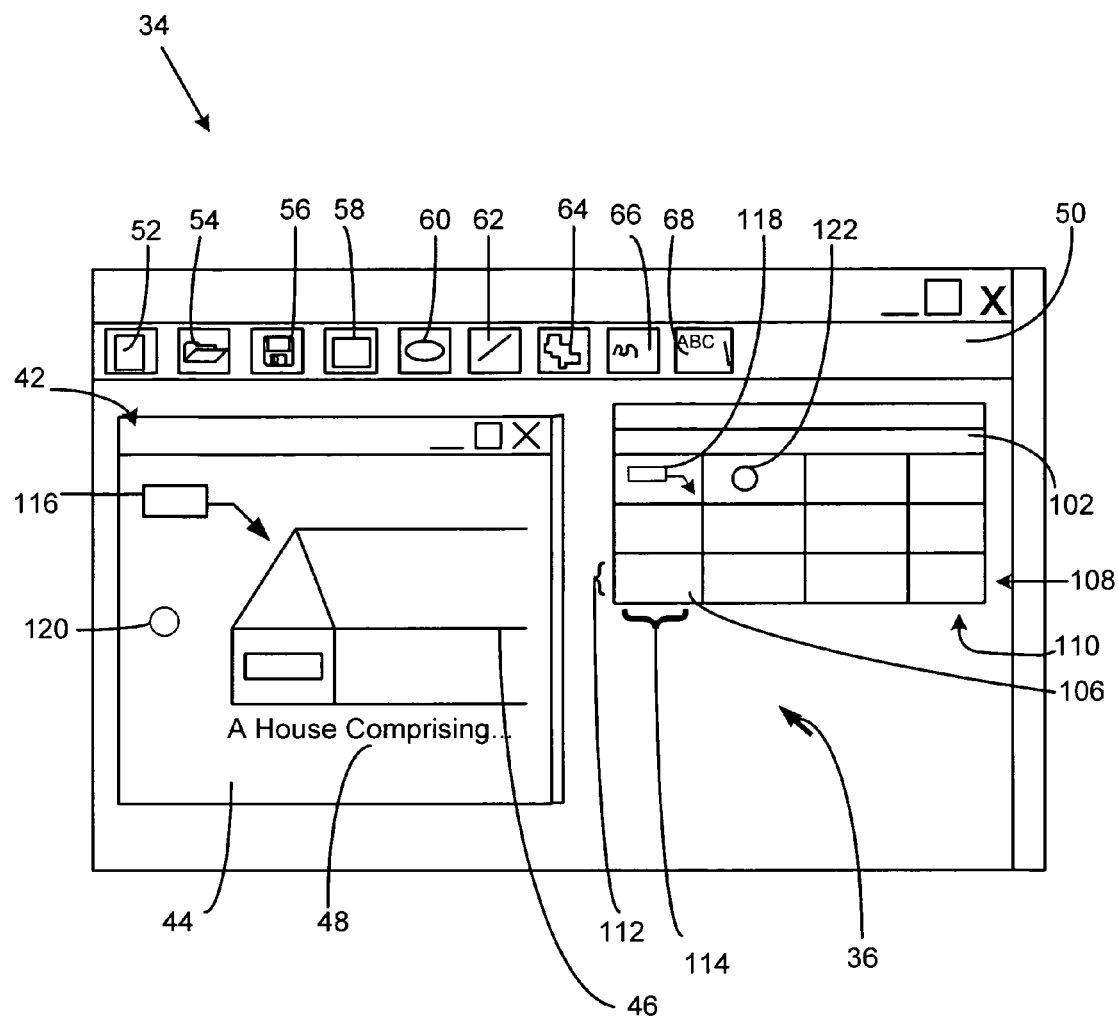
FIG. 3 illustrates a window having a tool bar, a workspace window and a palette window operable on the computer system of FIGS. 2 and 3 in accordance with an aspect of the present invention.

With regards to the specific interaction between a user and the computer system 10, with additional reference to FIG. 3, a cursor 36 is directed via the mouse 18 to locations within the monitor 14 having a number interactive elements, the details of which will be described more fully below. The mouse 36 may include one or more mouse buttons 38. A data processing procedure may be initiated by the user activating such interactive elements through clicking the mouse buttons 38 while cursor 36 is positioned on or near the interactive element. Additionally, a key 40 on the keyboard 20 may be pressed to initiate a data processing procedure.

It will also be understood by a person having ordinary skill in the art that while the following description of the invention refers to steps carried out in an exemplary computer system 10, any other data processing device having similar functionality may be used without departing from the scope of the invention. Moreover, while the following description of the invention refers to "clicking" a mouse button 38, "positioning" a cursor 36 within the monitor 14 and so forth, a person having ordinary skill in the art will recognize these terms to refer to any similar user interaction with the computer system 10 through a graphical user interface.

According to an aspect of the present invention, there is provided a method for dynamically recording, tracking and updating data objects for use on a recurring basis, whereby a user places a data object on a workspace window and selects a thumbnail generated in a palette window in response to the placement of the data object in the workspace window. With reference to FIG. 3, in the particular embodiment shown, the computer program 34 has a workspace window 42, with a document 44 containing document elements such as editable graphics 46, text 48, and combinations thereof. Additionally, the computer program 34 has a tool bar 50 containing icons 52, 54, 56, 58, 60, 62, 64, 66, and 68 that may be clicked to initiate a data processing procedure. For example, clicking a blank document icon 52 is operative to create a new document within the workspace window 42, while clicking an open document icon 54 is operative to open a dialog window well known in the graphical user interface art that generates a listing of existing documents which may be opened within the workspace window 42. Furthermore, clicking a save document icon 56 is operative to commit the changes made to the document 44 and store the same on a long term storage device such as the hard drive 28.

In addition to such system maintenance procedures described above, the tool bar 50 includes icons 58, 60, 62, 64, 66, and 68, each of which are graphical representations of a tool which, when selected, further limit and define the parameters of data processing operations that are initiated as a result of user interaction with the computer program 34. Such data processing operations involve the creation of data objects within the workspace window 42, as illustrated by the examples set forth below. The term "data object" as used herein refers to a conceptual entity generally corresponding to a contiguous block of a specific size at a specific location in memory having one or more attributes that define the entity. Accordingly, the editable graphics 46 and the text 48, as well as the specific examples of annotations generated on the workspace window 42 as set forth below, will be understood to be encompassed by the term data object. Furthermore, the selection of a given tool icon and/or the generation of a corresponding data object on the workspace window 42 as set forth in the examples below are generally understood to mean "using" that particular tool associated with the data object.

In the following examples, specific data object types will be discussed, however, it is understood than any data object capable of being displayed on the workspace window 42 is deemed to be encompassed within the scope of the present invention, such as brush strokes, text blocks, and so forth. Additionally, data objects may also include graphics copied from existing sources, such as digital pictures and other raster images which are defined in terms of pixel value instead of in terms of geometric primitives.

Figure 4A:
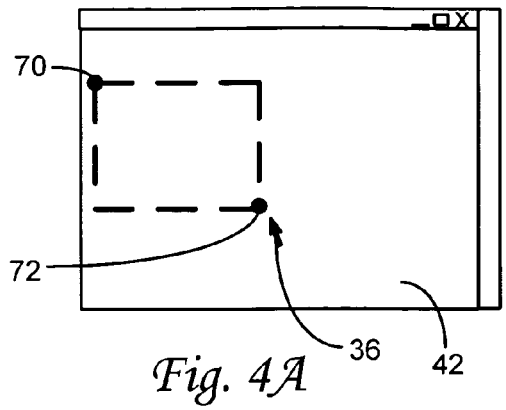
FIG. 4a illustrates an object being created on the workspace window.
Figure 4B:
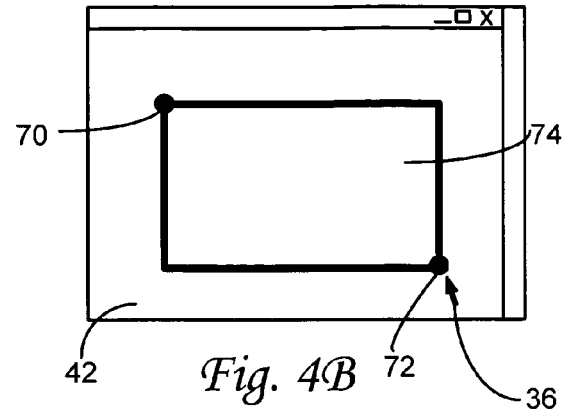
FIG. 4b illustrates a box after being created on the workspace window.
Figure 4C:
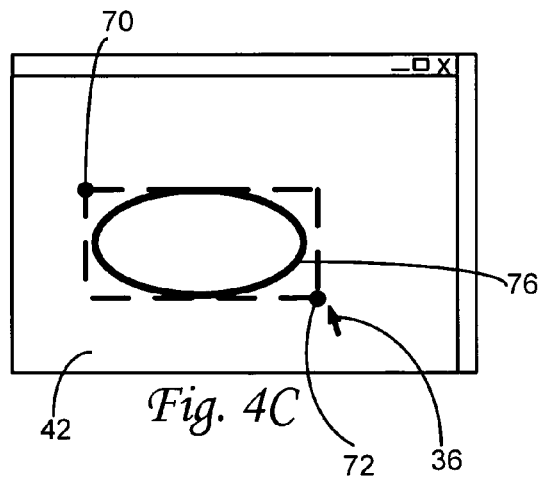
FIG. 4c illustrates an ellipse after being created on the workspace window.
Figure 4D:
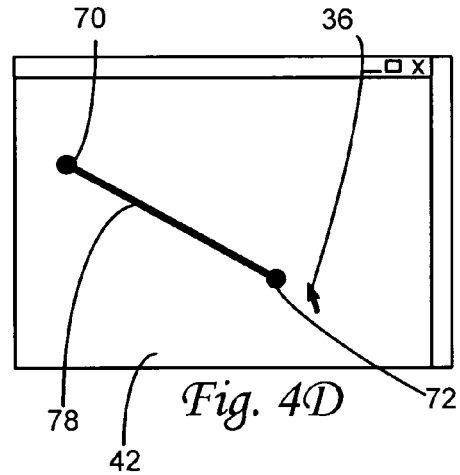
FIG. 4d illustrates a line after being created on the workspace window.

In a first example, with reference now to FIGS. 4a and 4b there is depicted the workspace window 42 and a sequence of views depicting the generation of a data object defined as a box 74. The process begins with selecting a box icon 58 from the tool bar 50 as shown in FIG. 3. In the workspace window 42 the method includes clicking the mouse button 38 at a first location 70 within the workspace window 42, dragging the cursor 36 to a second location 72, and releasing the mouse button 38 to generate a data object defined as the box 74. The box 74 has opposed corners of the first location 70 and the second location 72. In another example, the method may include first selecting an ellipse icon 60 from the toolbar 50 as shown in FIG. 3 and performing similar operations as above to generate a data object defined as an ellipse 76 as shown in FIG. 4c. The ellipse is defined by opposed corners of the first location 70 and the second location 72. As per another example, the method may first selecting a line icon 62 from the tool bar 50 as shown in FIG. 3. As depicted in FIG. 4d, the method includes performing similar operations as above to generate a data object defined as a line 78 having endpoints at the first location 70 and the second location 72.

Figure 4E:
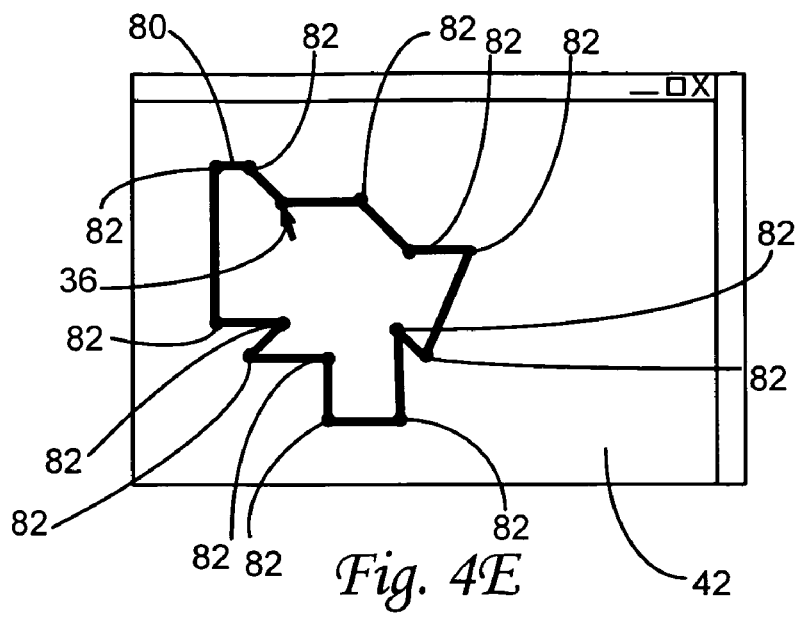
FIG. 4e illustrates a polygon after being created on the workspace window.
Figure 4F:
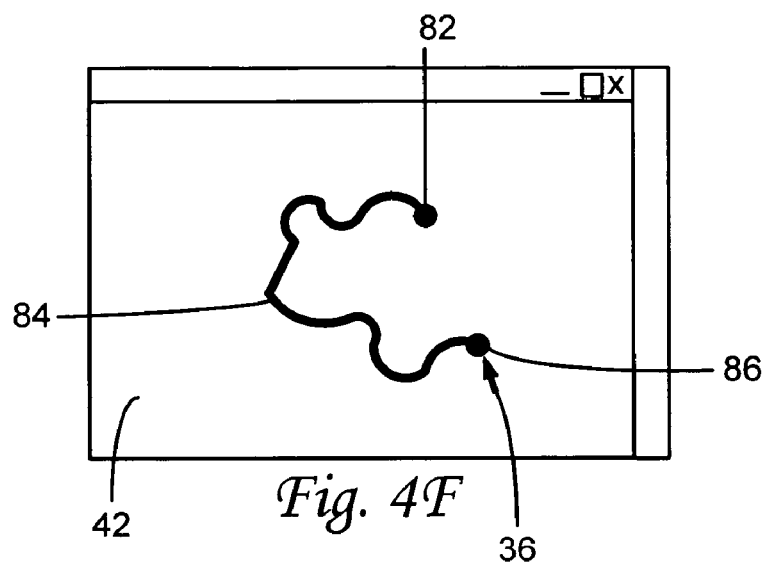
FIG. 4f illustrates a freeform graphic after being created on the workspace window.

The data objects capable of being created on the workspace window 42 are not limited to primitive geometric shapes created by defining opposed endpoints in the manner previously described. The data objects can include complex shapes such as a polygon 80 having multiple endpoints 82 with segments interconnecting the same as shown in FIG. 4e. In generating the polygon 80, a polygon icon 64 of FIG. 3 is selected, and then the cursor 36 is navigated to each of the endpoints 82, the mouse button 38 is selected at each endpoint and a line segment is then generated between the previous endpoint and the recently selected endpoint. It is contemplated that lining effects may be imposed upon the polygon 80 so as to modify the lining from the solid lining as shown to dashed, paintbrush, cloud effect, etc. Freeform objects such as a free form object 84 may also be generated on the workspace window 42 by first selecting a freeform object icon 66 of FIG. 3. As shown in FIG. 4f, the method of generating another data object may include selecting an endpoint 82, clicking the mouse button 38, and dragging the cursor 36 in the desired outline 84. The mouse button 38 is again clicked once the cursor 36 is positioned at an ending endpoint 86.

Figure 4G:
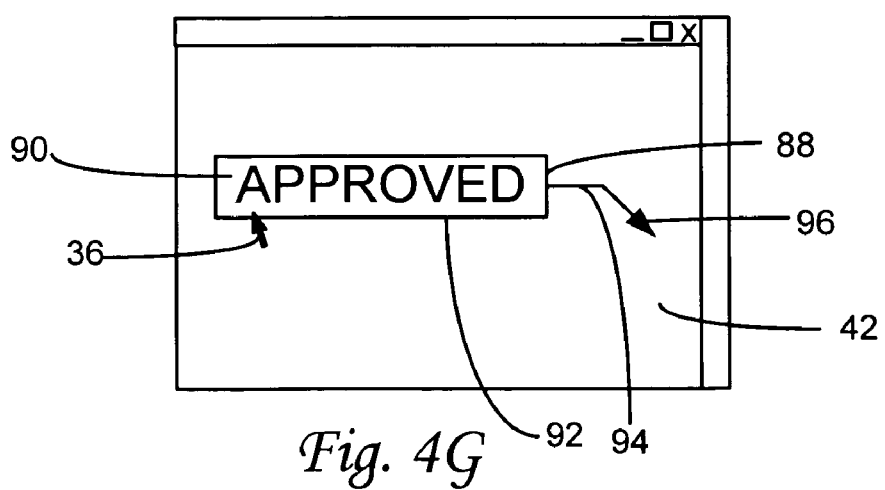
FIG. 4g illustrates a callout box after being created on the workspace window.

Another data object that can be generated on the workspace window 42 is a callout box 88 as shown in FIG. 4g. The call out box 88 may typically include a box-shaped container 90, a callout text 92, and a callout line 94 with an arrow 96. The callout box 88 may be generated in steps similar to that of generating the box 74 of FIG. 4b, but because the callout box 88 typically requires little dimensional adjustment upon placement for consistency across multiple instances, an alternative method may include selecting a callout box icon 68 as shown in FIG. 3 and clicking a placement location within the workspace window 42. Thereafter, the callout box 88 is placed on the workspace window 42, and the callout text 92 may be added via keyboard input. Additionally, the dimensions of the callout line 94 and the arrow 96 may be modified according to the method set forth below.

It is noted that in general when generating new data objects by selecting a given thumbnail, the cursor 36 may be modified to graphically represent the given thumbnail as being dragged to the desired location in the workspace window 42. In this regard, the mouse button 38 may be click to select the given thumbnail and continued to be depressed while navigating to the desired location where it is finally released. During such navigating, the dragged representation of the thumbnail would serve as a preview of the action to be implemented.

Figure 5A:
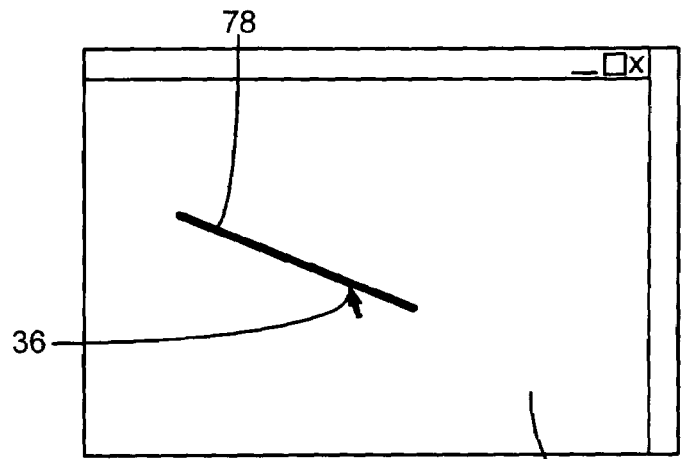
FIG. 5a illustrates a line being selected by the user.
Figure 5B:
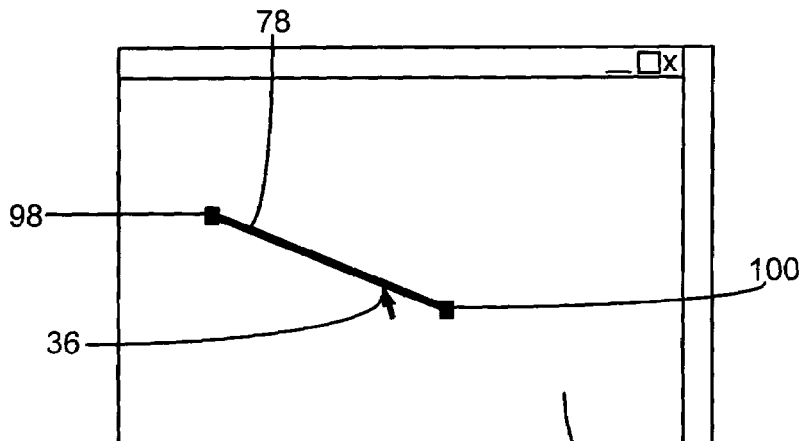
FIG. 5b illustrates a control point of the line being selected by the user.
Figure 5C:
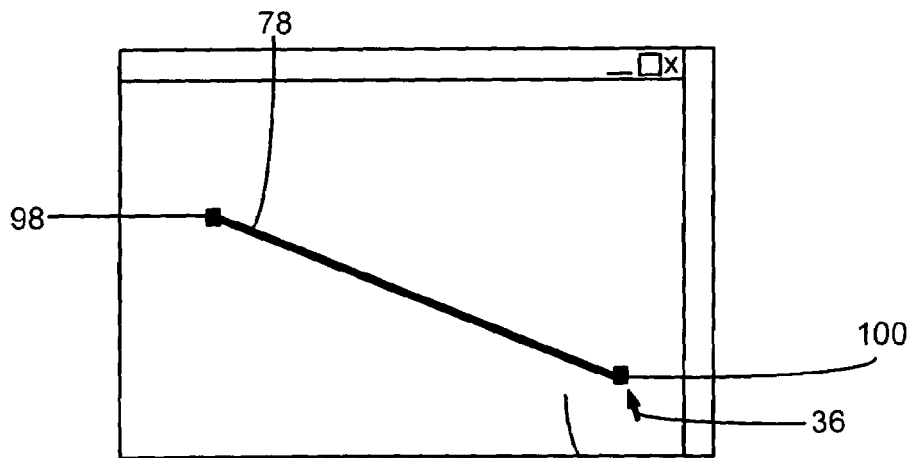
FIG. 5c illustrates the line being modified by the user.

Modifications may also be made to the data objects already placed on the workspace window 42. For the purpose of simplification, and with reference to FIGS. 5a-5c, the line 78 is shown on the workspace window 42. Upon selecting the line 78 by navigating the cursor 36 to overlap the same, the mouse button 38 is clicked, producing handles 98 and 100. The cursor 36 is then navigated to one of the handles 100, where as illustrated, the cursor 36 overlaps the handle 100, and the mouse button 38 is pressed down. While the mouse button 38 is pressed down, the cursor 36 and the handle 100 are dragged to the desired location, thus modifying the endpoint of line 78. In essentially the same manner, other data objects can be modified. In this regard, the term "modify" as used herein refers to the steps taken to change the appearance or contents of data objects as described.

While the steps and the user inputs necessary to generate and modify the data objects illustrated in FIGS. 4b-4f have been detailed with reference to mouse inputs in specific sequences, alternative sequences may also be utilized. A person having ordinary skill in the art will recognize the above described sequences are the most commonly utilized in graphical computer applications capable of modifying and arranging data objects graphically in real-time, but there are other existing sequences that may be substituted without departing from the scope of the present invention.

Figure 6A:
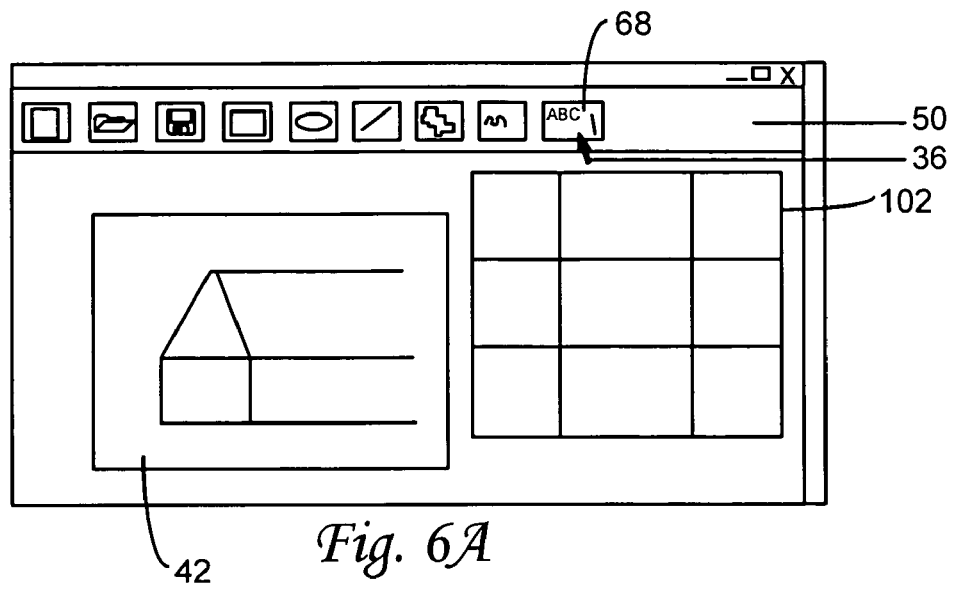
FIG. 6a illustrates an icon on the toolbar being selected by a user.
Figure 6B:
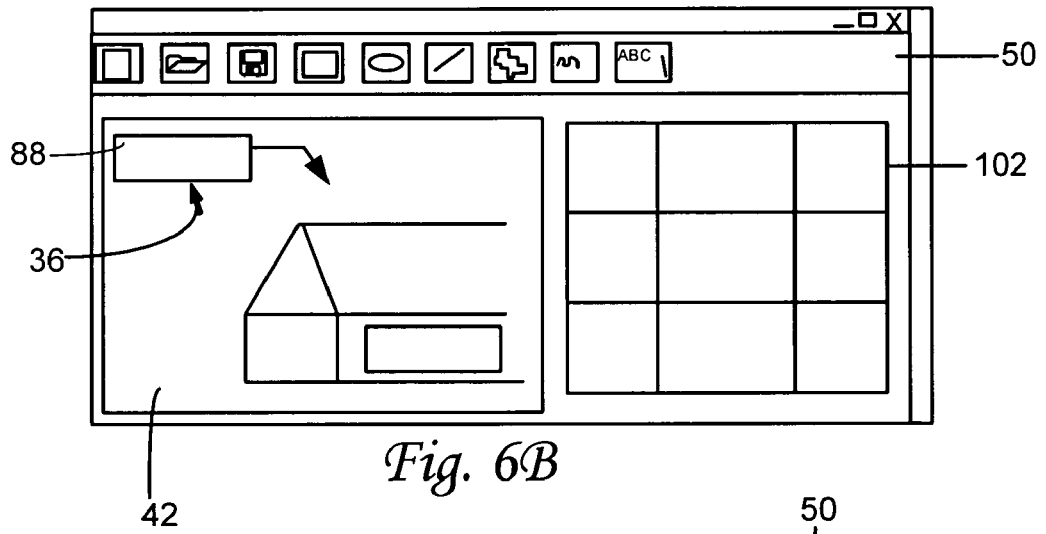
FIG. 6b illustrates a data object being placed in the workspace window.
Figure 6C:
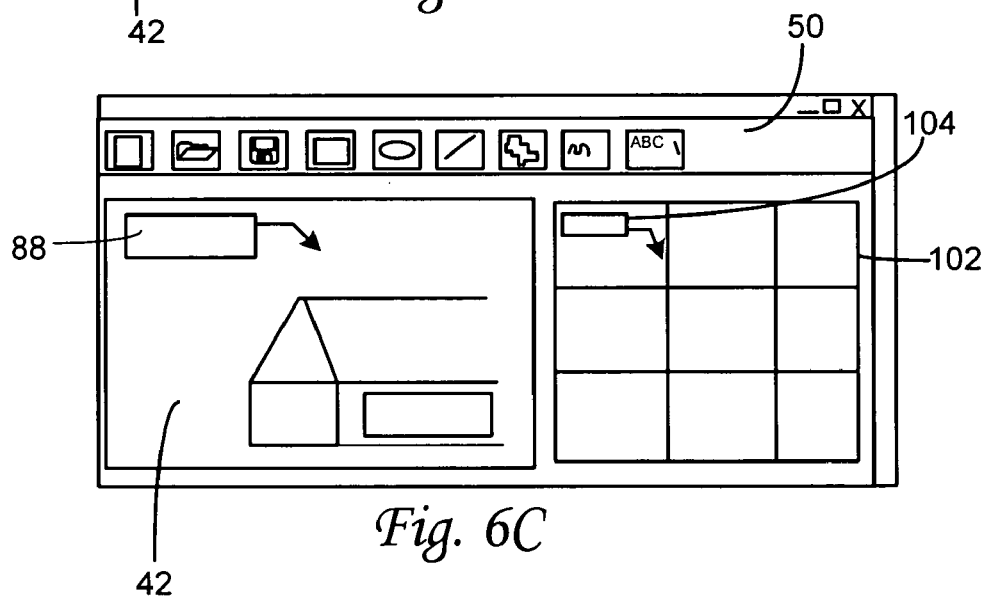
FIG. 6c illustrates a thumbnail being generated in response to the data object being placed in the workspace window.
Figure 7:
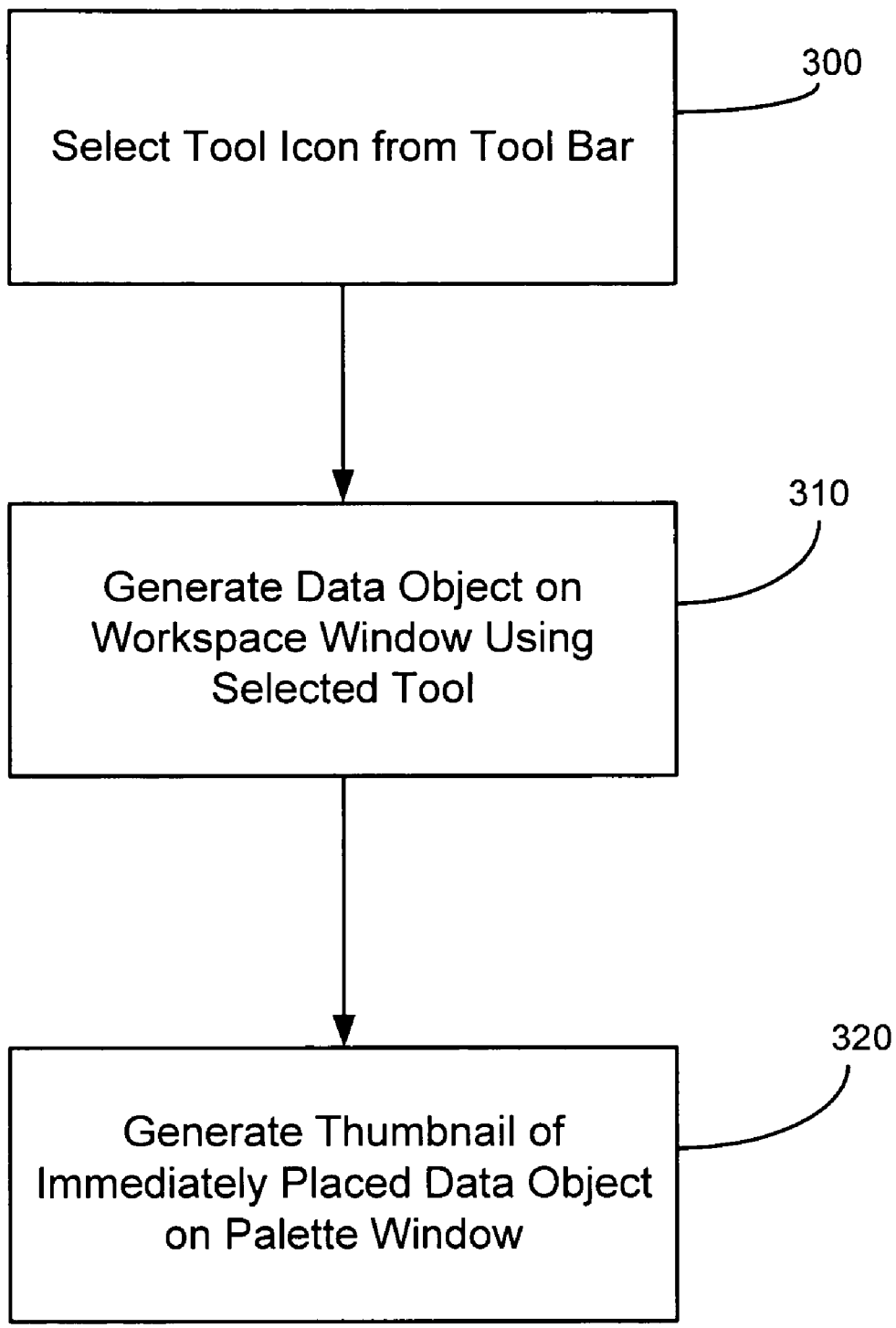
FIG. 7 is a flowchart illustrating the steps taken to generate a palette window in accordance with an aspect of the present invention.

Referring now to FIGS. 6a-6c there is depicted a sequence of views of the workspace window 42. FIG. 7 depicts a flowchart illustrating a method for generating a thumbnail 104 in a palette window 102 in relation to the user's perspective will now be discussed. For the purpose of example only and not of limitation, the method includes a step 300 of selecting a tool icon (such as any of the icons 58, 60, 62, 64, 66, or 68 from the tool bar 50 for example). Next, the method includes the step 310 of generating a data object on the workspace window 42 using the selected tool associated with such tool icon. Finally, the method includes the step 320 of generating a thumbnail of the immediately placed data object on the palette window 102.

In further detail as discussed with reference to FIGS. 6a-c, there is depicted a sequence of views of the workspace window 42 and the palette window 42. This example illustrates generation of a data object in the form of a callout box 88. The callout box icon 68 is clicked after the navigating cursor 36 to the same as in the step 300 and as further illustrated in FIG. 6a. At this point, the palette window 102 is blank as shown. Thereafter, the callout box 88 is placed within the workspace window 42 according to the step 310 and as shown in FIG. 6b. The desired placement location is selected by navigating the cursor 36 to such location and clicking the mouse button 38. Prior to releasing the mouse button 38, the palette window 102 is also blank. Upon releasing the mouse button 38, the callout box 88 is placed on the workspace window 42, and a thumbnail 104 is generated in the palette window 102 according to the step 320.

The generation of the thumbnail 104 in the palette window 102 presupposes that there is no duplicate data object already displayed as a thumbnail in the palette window 102. If such duplicate thumbnail already exists in the palette window 102, a new thumbnail representative of the immediately placed callout box 88 is not generated in the palette window 102. This is because, there would be no need to provide the user with the availability of the thumbnail as a readily accessible "tool" or "shortcut" for his/her usage and such a tool would already be available. In this regard, duplicate data objects placed on the workspace window 42 are not duplicated in the palette window 102. The decision making procedures related to this functionality will be discussed in further detail hereunder.

Referring back to FIG. 3, the palette window 102 is divided into individual cells 106 and organized in rows 108 and columns 110. Each individual cell 106 is defined by a cell height 112 and a cell width 114. According to one embodiment, the cell height 112 and the cell width 114 may be adjusted by the user individually. According to another embodiment, the cell height 112 and the cell width 114 adjust in size as the overall size of the palette window 102 is adjusted. According to still another embodiment, the cell height 112 and the cell width 114 are predetermined, that is, not adjustable, where only the number of cells 106 displayed in the palette window 102 per row 108 or per column 110 are adjusted as the size of the palette window 102 is adjusted.

Regardless of variety in the sizing adjustments capable of being made according to the various embodiments, exemplary thumbnails 118 and 122 are scaled to fit the constraints of the cell width 112 and the cell height 114. Thus, if the size of the data object is larger than the screen area defined by the cell height 112 and the cell width 114 as in an exemplary callout box 116, then the corresponding exemplary callout box thumbnail 118 is scaled down to appear smaller than that of the data object. Along these lines, if the size of the data object is smaller than the screen area defined by the cell height 112 and the cell width 114 as in an exemplary ellipse 120, then a corresponding exemplary ellipse thumbnail 122 is scaled up to appear larger than that of the data object. Moreover, if the size of the data object is the same as the screen area defined by the cell height 112 and the cell width 114, then there is no scaling necessary to produce a thumbnail. As will be readily understood, an exemplary callout box 116 and the exemplary ellipse 120 may be scaled according to any well known technique in the art, and the exemplary callout box thumbnail 118 need not be an exact representation having all of the details contained in the callout box 116.

Figure 8A:
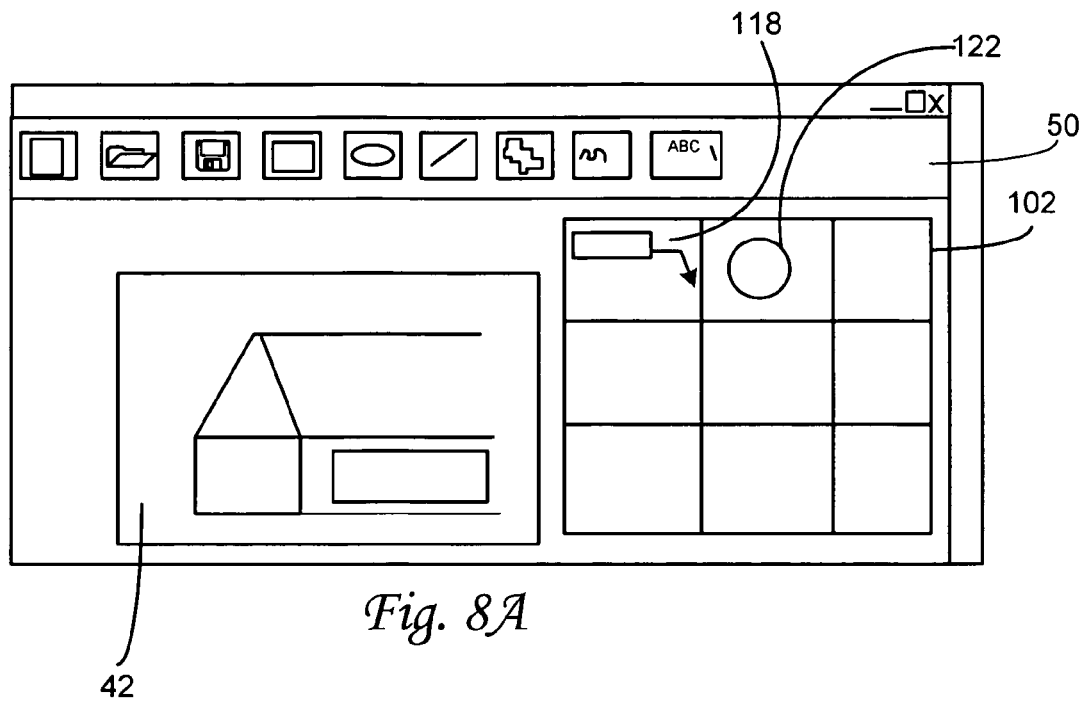
FIG. 8a illustrates a workspace window having no data objects placed thereon with a palette window containing thumbnails.
Figure 8B:
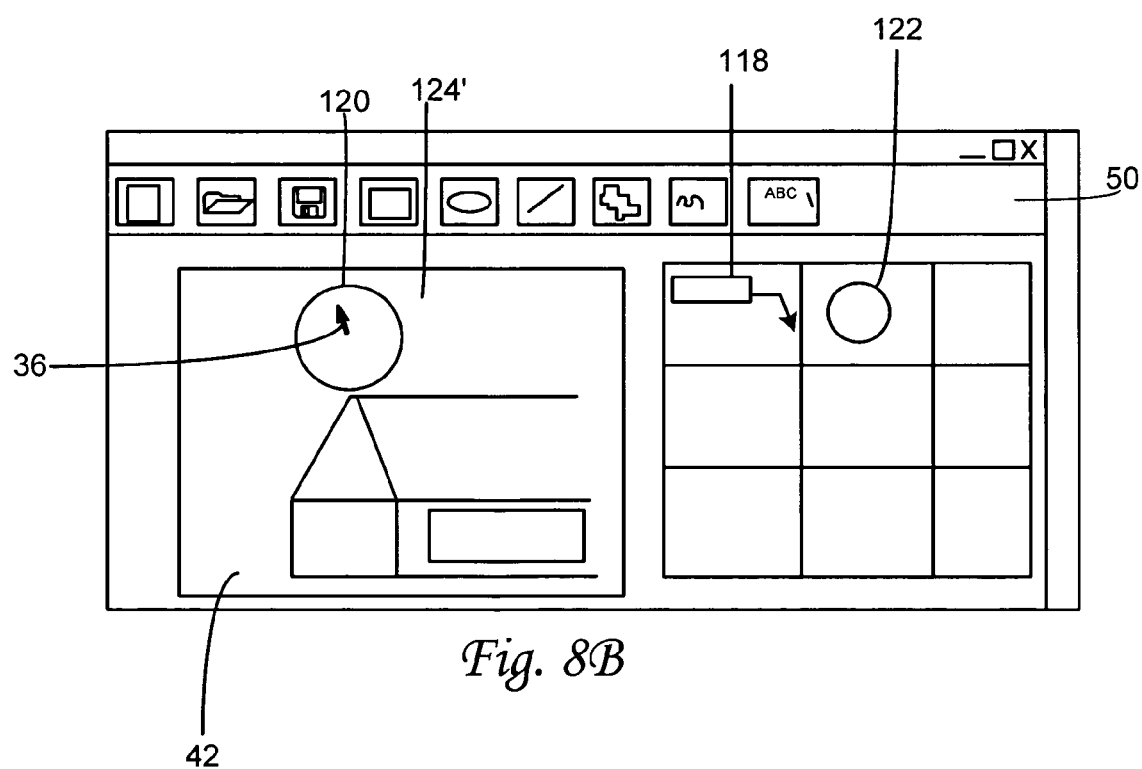
FIG. 8b illustrates the workspace window having a data object placed thereon and being moved after a selection of a thumbnail on the palette window.

Now referring to FIGS. 8a-d there is depicted a sequence of views of the workspace window 42. FIG. 9 depicts a flowchart illustrating a sequence of using thumbnails on the palette window 102 to paste data objects to the workspace window 42. As in this context, the term "using" is also understood to include such operation in which a thumbnail is selected and a resultant copy of the data object represented thereby is placed on the workspace window 42. As shown in FIG. 8a, the workspace window 42 has no existing data placed thereon. The palette window 102 has the exemplary callout box thumbnail 118 and the exemplary ellipse thumbnail 122, both of which can be clicked to select the respective thumbnail according to step 330.

According to one embodiment, the user may then navigate to a desired location within the workspace window 42 per step 340. The mouse button 38 can then be pressed, placing the exemplary ellipse 120 on the workspace window 42 as shown in FIG. 8b. It will be understood that the exemplary ellipse 120 is a copy in all respects, including dimension and other attributes, of an ellipse annotation originally copied and now represented by the exemplary ellipse thumbnail 122 as in step 350. Further, as will be appreciated by one of ordinary skill in the art, the mouse button 38 can continue to be depressed, and cursor 36 may be navigated to a desired location while a ghost image 124 of the exemplary ellipse 120 appears on the workspace window 42 and moves with the cursor 36.

Figure 8C:
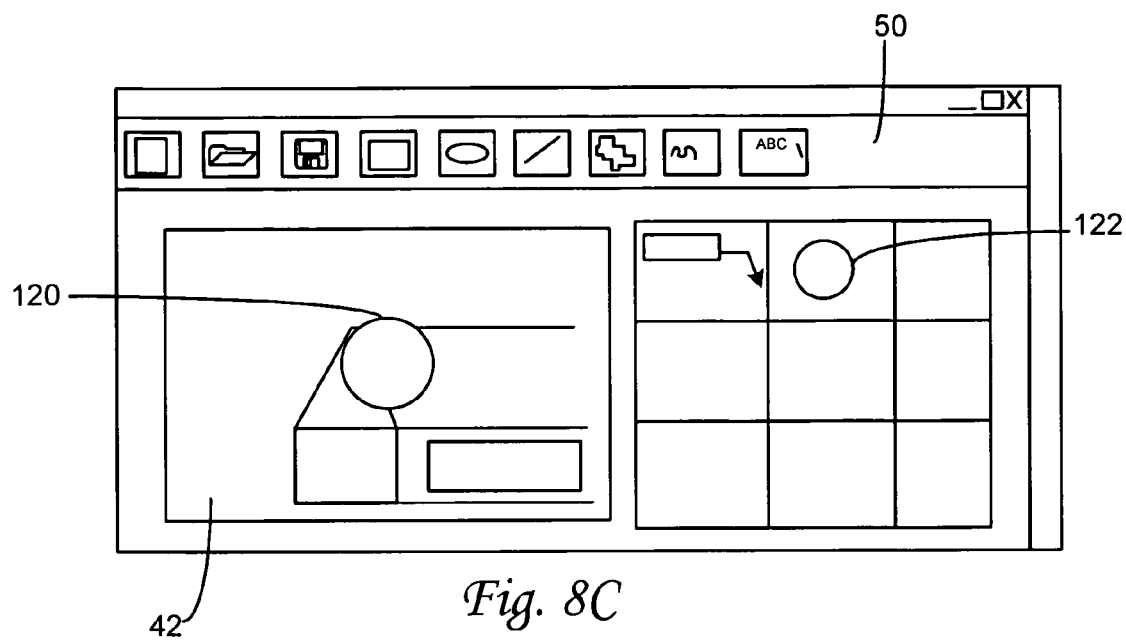
FIG. 8c illustrates a data object being placed in a central region of the workspace window after a selection of a corresponding thumbnail.
Figure 8D:
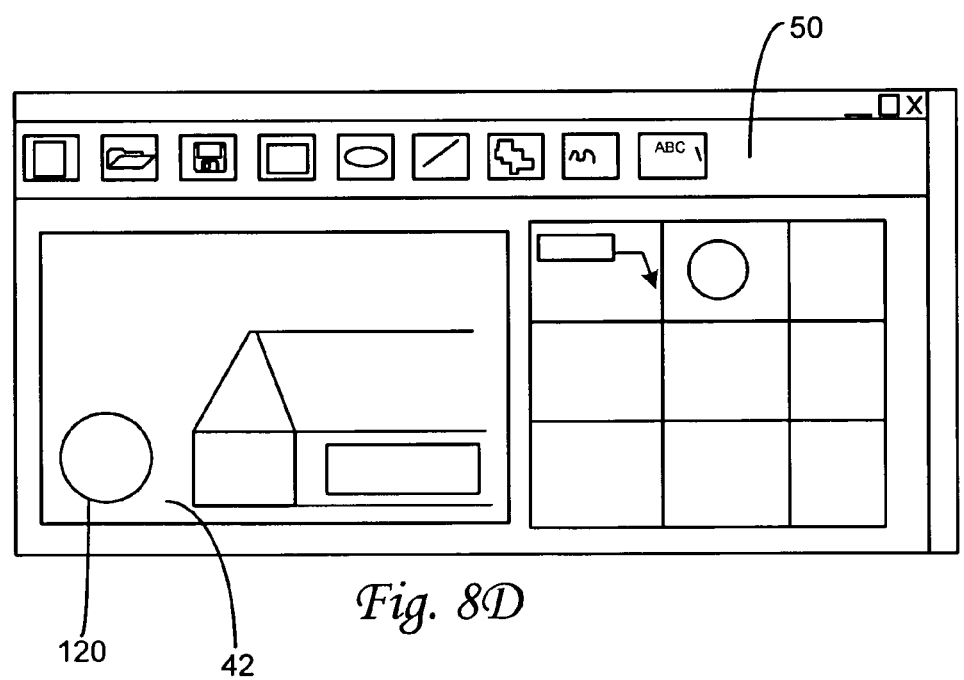
FIG. 8d illustrates another placement of a data object in the workspace window after a selection of a corresponding thumbnail.
Figure 9:
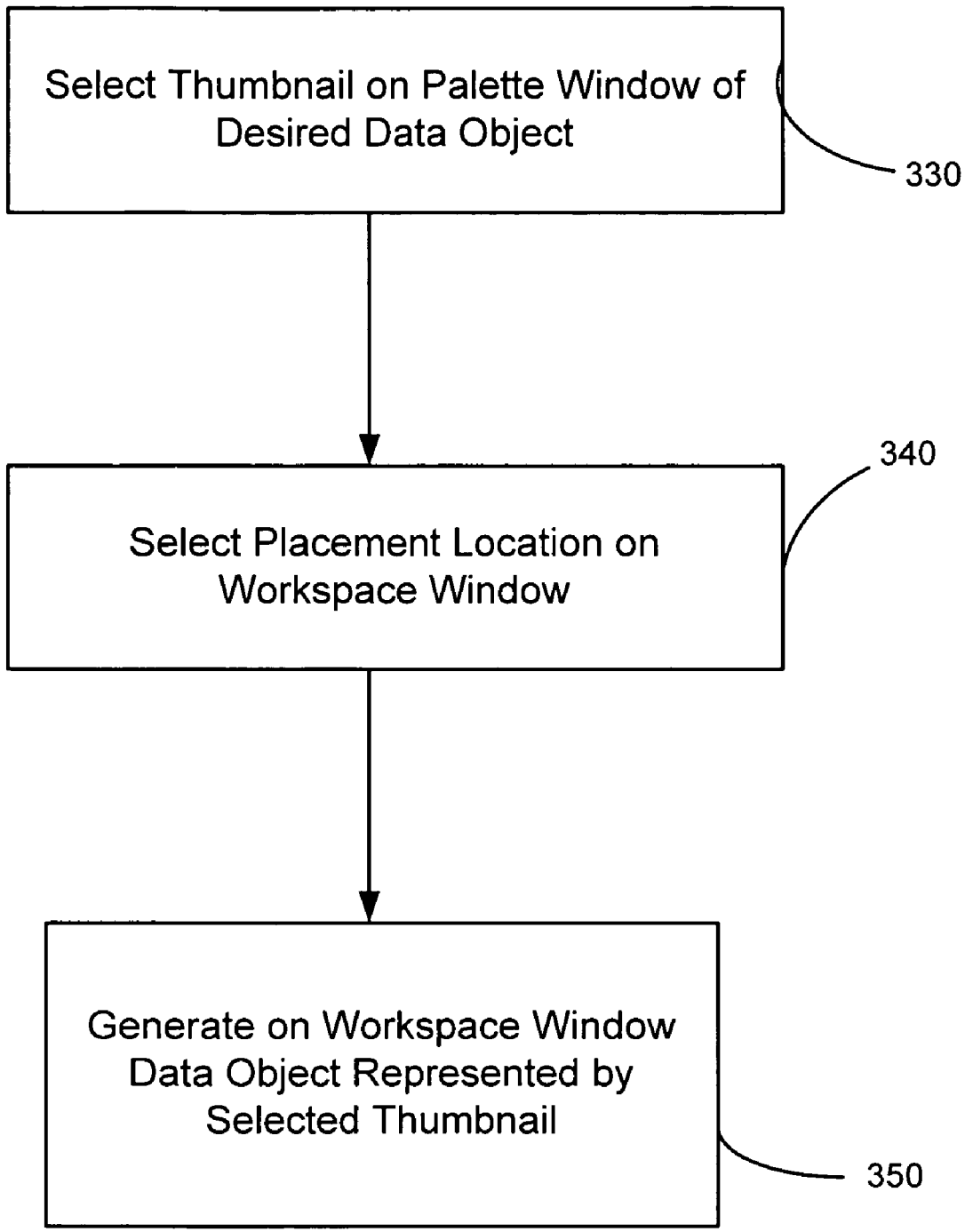
FIG. 9 is a flowchart illustrating the steps taken to place the data object on the workspace window by selecting the thumbnail on the palette window.

According to another embodiment, the user may merely click on the ellipse thumbnail 122 and a copy of the exemplary ellipse 120 represented thereby may be automatically placed in the center region of the workspace window 42 as shown in FIG. 8c. The location of automatic placement may be varied, such as the lower left hand corner of the workspace window 42 as shown in FIG. 8d, without departing from the scope of the invention.

Upon placing the annotations on the workspace window 42, it is recognized that the immediately placed data object may already exist as it is already represented by a thumbnail in the palette window 102. Accordingly, a new thumbnail corresponding to such immediately placed data object will not be generated in palette window 102.

Figure 10A:
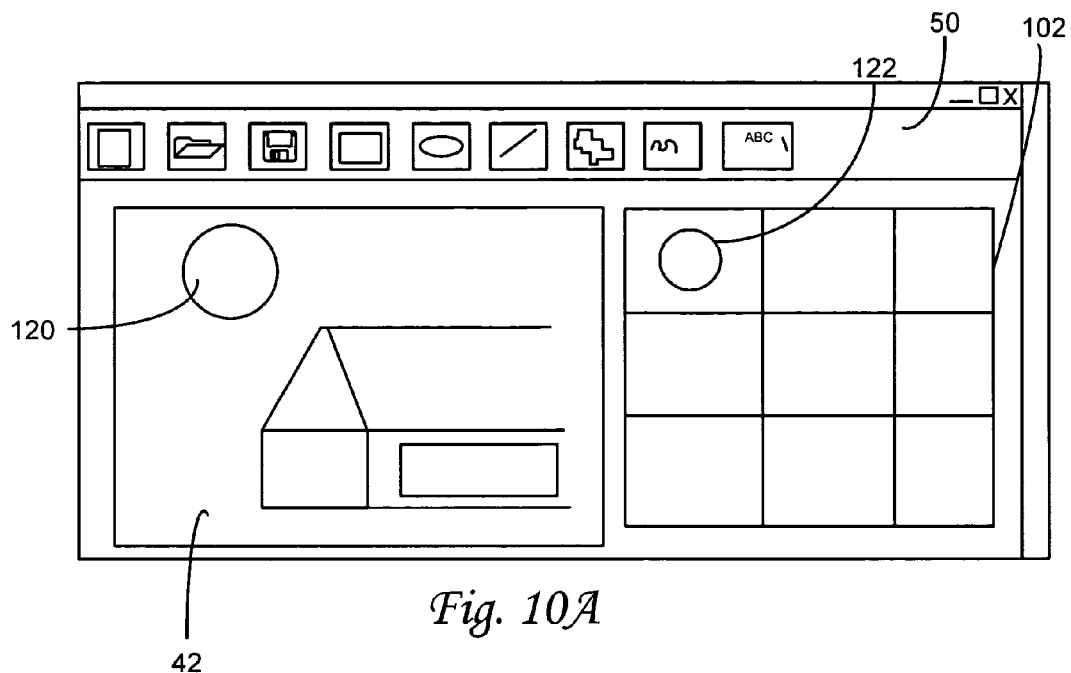
FIG. 10a illustrates a data object on a workspace window and a corresponding thumbnail on a palette window.
Figure 10B:
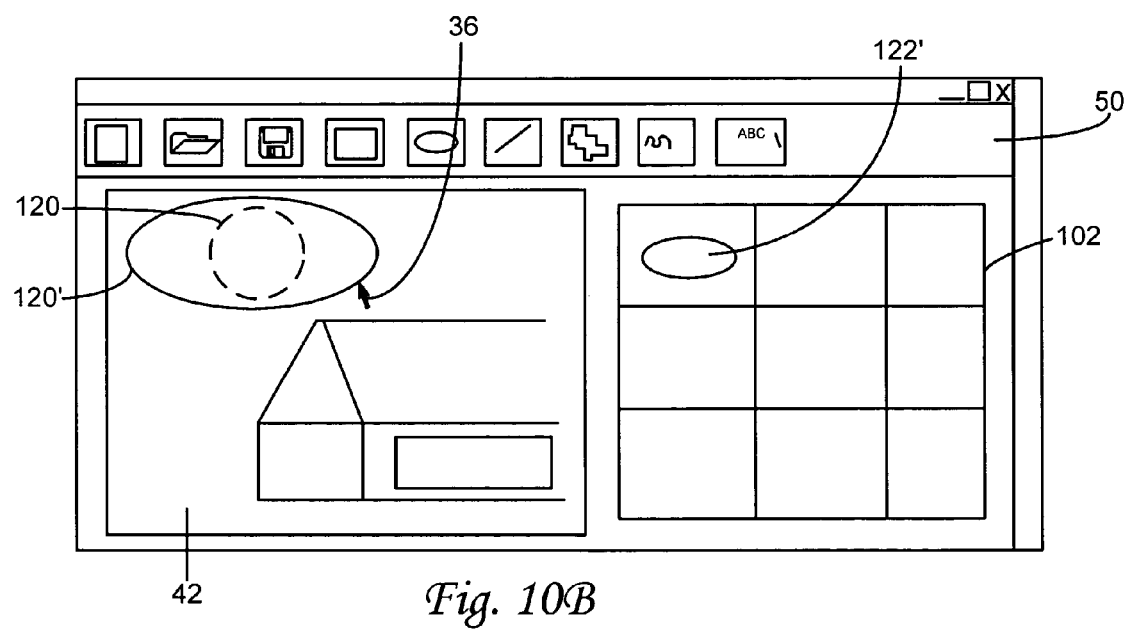
FIG. 10b illustrates the data object being modified on the workspace window and a corresponding thumbnail likewise being modified.
Figure 10C:
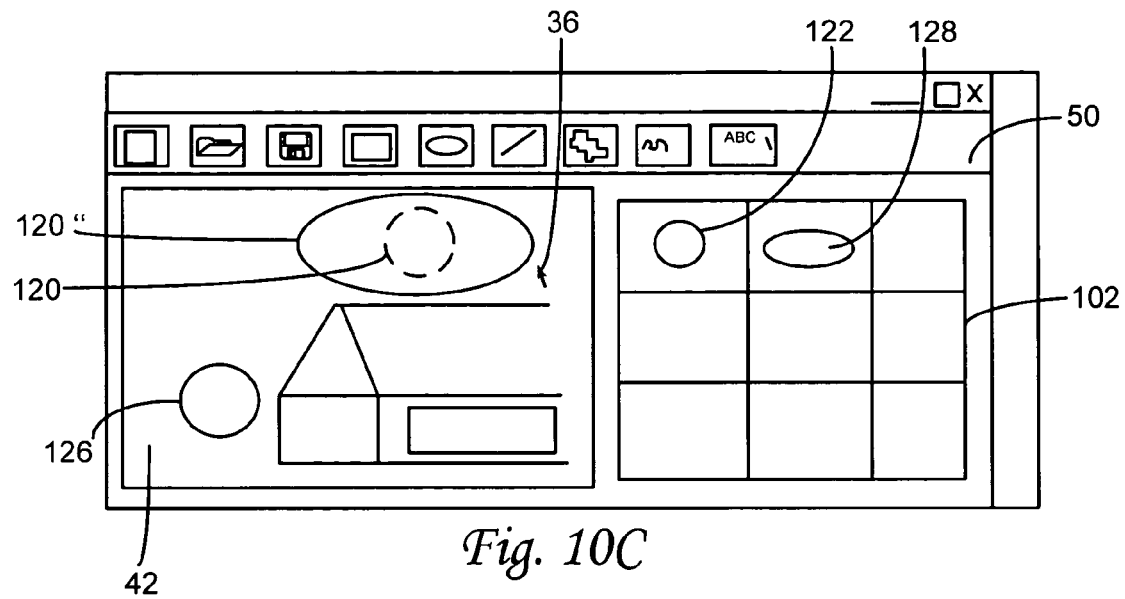
FIG. 10c illustrates another data object being modified on the workspace window and a corresponding thumbnail being generated on the palette window.
Figure 11:
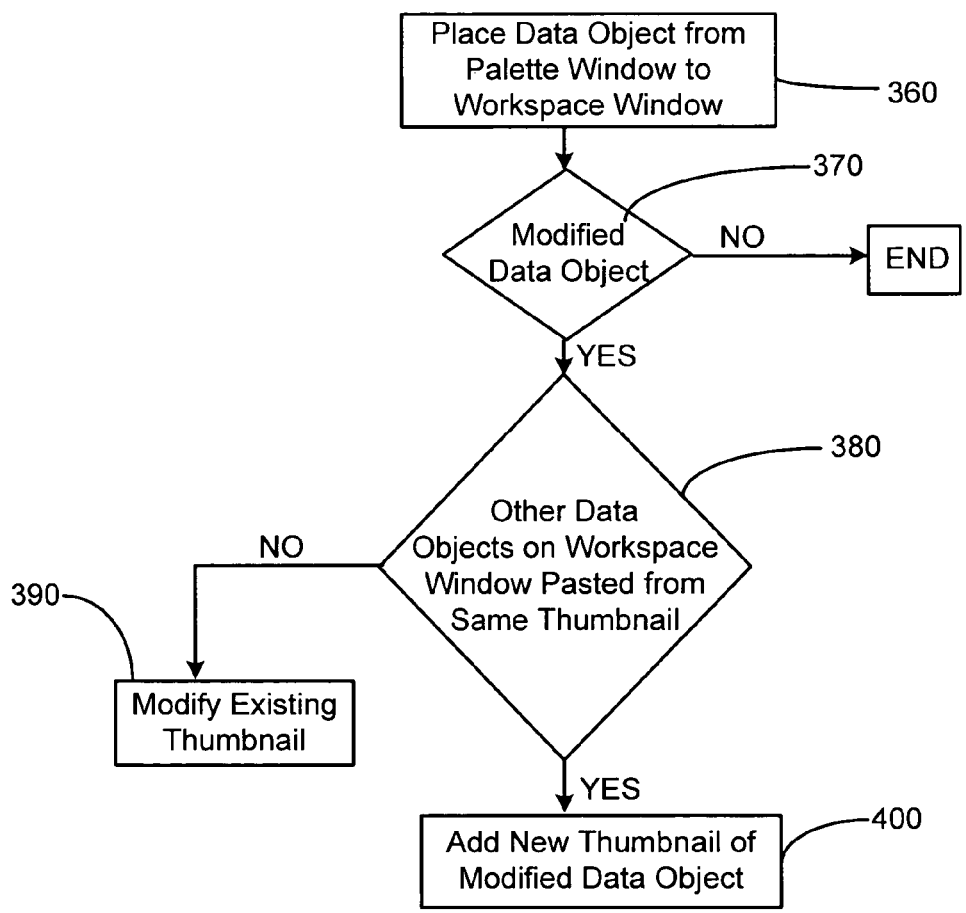
FIG. 11 is a flowchart describing the decisions made to determine whether to dynamically modify a thumbnail or to generate a new thumbnail.

With reference now to FIGS. 10a-c there is depicted views of the workspace window 42. FIG. 11 depicts a flowchart illustrating steps in the modification of an existing data object, in this case the exemplary ellipse 120, which is provided by way of example only, and its resulting effect on the palette window 102. In step 360 as shown in FIG. 10a, the exemplary ellipse 120 (a copy of which is represented by the ellipse thumbnail 122) is placed on the workspace window 42. The exemplary ellipse 120 is in the form of a cicle. The current state of the palette window 102 and the workspace window 42 is illustrated in FIG. 10a.

Further, in step 370, the exemplary ellipse 120 is modified as shown in FIG. 10b in accordance with the methods for modifying data objects as set forth above. The exemplary ellipse 120 (shown now in dashed lining) is modified to become a modified ellipse 120'. As the exemplary ellipse 120 is being modified, the changes may be immediately reflected in the exemplary ellipse thumbnail 122 into a modified ellipse thumbnail 122' as in step 390, and as further illustrated in FIG. 10b. This presupposes that it is determined in step 380 that there are no data objects currently existing on the workspace window 42 that resulted from selecting the exemplary ellipse thumbnail 122.

Referring now to FIG. 10c, there is depicted a secondary exemplary ellipse 126 generated from the ellipse thumbnail 122. There is also depicted an exemplary ellipse 120 (shown in dashed line) also generated from the ellipse thumbnail 122. In this embodiment, the user is shown to be in the process of just having completed modifying the exemplary ellispse 120 to a modified ellipse 120". In step 380 it was determined that other data objects such as the second exemplary ellipse 126 which existed on workspace window 42 and placed as a result of selecting the exemplary ellipse thumbnail 122, any modifications made, such as that resulting in the exemplary ellipse 120", a new ellipse thumbnail 128 is generated in the palette window 102 according to step 400. Thus, a new tool becomes available to the user.

According to an aspect of the present invention, there is provided a method of tracking data objects on a data processing device (such as the personal computer 12) having an output device (such as the monitor 14). Such a method would be from a perspective of a user. The method includes the step of storing in a workspace memory a data object having data object attributes associated therewith (such as a tool type attribute 132 or a parameters attribute 134, as discussed below). The method further includes the step of storing in a palette memory the data object where the data object attributes do not match all attributes of any preexisting data object stored in the palette memory. The method further includes the step of generating on the workspace window 42 the data object. The first data object is in accordance with the data object attributes. The method further includes the step of generating on the palette window 102 a thumbnail. The thumbnail is a depiction of the data object scaled to a predetermined size.

According to another aspect of the present invention, there is provided a method for using a graphical computer application. The method includes a step of placing a data object on the workspace window 42. The data object has attributes associated therewith. The method further includes a step of selecting a thumbnail. The thumbnail is generated on the palette window 102 in response to the placement of the data object on the workspace window 42 and is a scaled representation of the data object. The attributes of the data object do not match the attributes of any preexisting data object represented as a thumbnail in the palette window 102.

Figure 12:
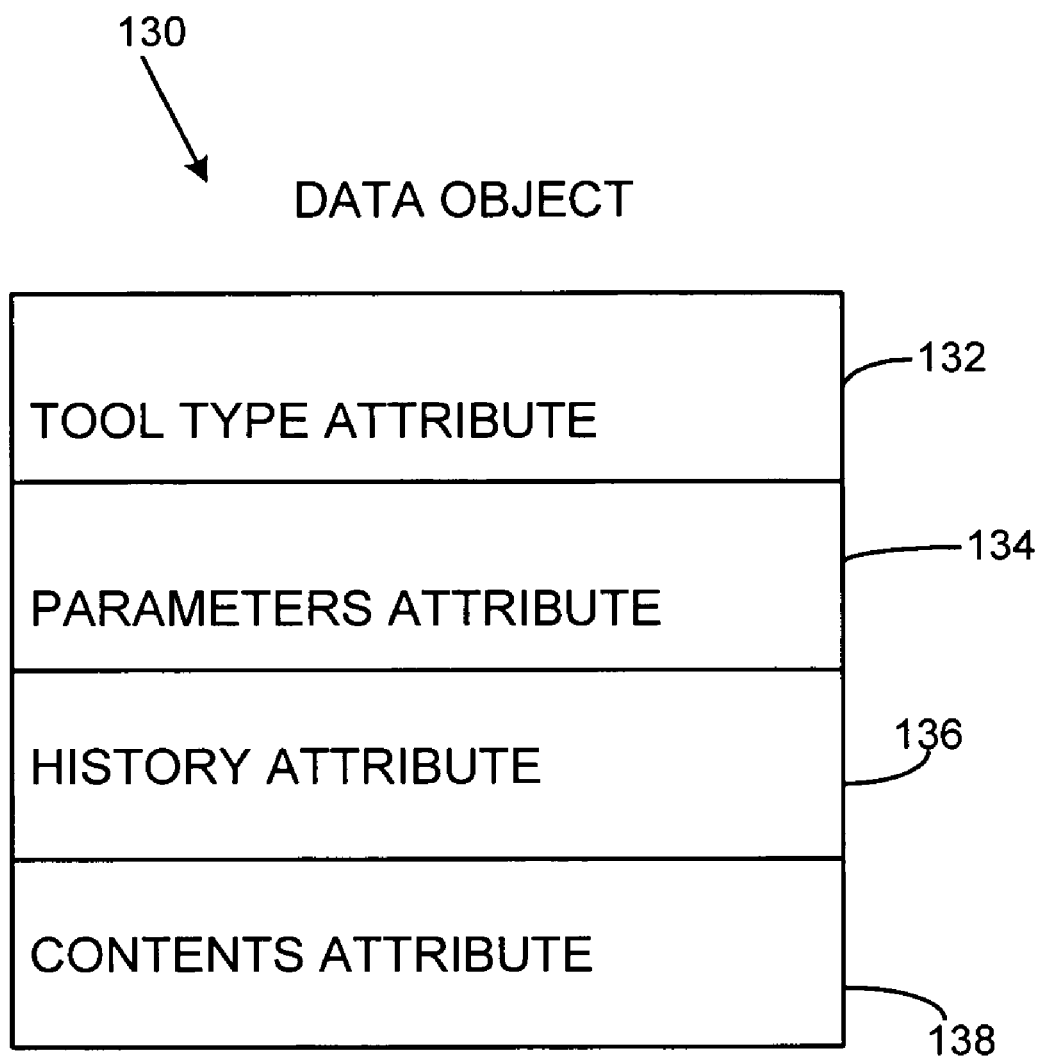
FIG. 12 is a block diagram illustrating exemplanary attributes associated with a data object.

As discussed above, a data object is an entity generally corresponding to a contiguous block of memory having attributes defining the entity. FIG. 12 shows a block diagram of a data object 130. The tool type attribute 132 defines the type of tool used to create the data object, such as box tool, ellipse tool, line tool, polygon tool, freeform tool, callout box tool, and so forth. It essentially defines the type of the data object. The parameters attribute 134 defines the dimensions and the appearance of the annotation, such as the coordinates of the relevant endpoints defining the data object as it appears on the workspace window 42. A history attribute 136 is operative to indicate whether a particular data object should continue to be accessible for pasting through the palette window 102. The significance of this attribute will become apparent as further details of the organization of thumbnails on the palette window 102 are discussed hereunder. Finally, a contents attribute 138 further defines the data object, such as text, font characteristics of such text, and alignment. As will be understood by a person having ordinary skill in the art, the various attributes 132, 134, 136, and 138 set forth merely describe broad, general categories of data that may be stored therein, and the present invention may utilize other data structures to accomplish the same result without departing from the scope of the invention.

As mentioned above, upon generating a data object on the workspace window 42, the data object is stored in the workspace memory. With reference again to FIGS. 1, 2, and 3, according to an embodiment of the present invention, the workspace memory is a reserved area of the RAM 30 on the computer system 10 holding all data objects generated on the workspace window 42. Although the use of the RAM 30 is preferred because of its relatively fast access speeds, alternative storage mediums such as the hard drive 28 may be utilized. Essentially, any medium capable of storing data may be utilized. In similar fashion, when a thumbnail is generated on the palette window 102, the data object associated therewith is stored in the palette memory, which is also a reserved area of the RAM 30 on the computer system 10. The data objects stored in the palette memory may also be permanently stored on the hard drive 28 for retrieval at a later time while editing a different document or while in a different user session. It will be understood that the term session as used herein refers to the use of the graphical computer application program from start to finish until the same stops running on the computer system 10. Sessions may be initiated and concluded on one computer system, and subsequently initiated and concluded on a different computer system while still utilizing the same contents of the palette memory.

Figure 13:
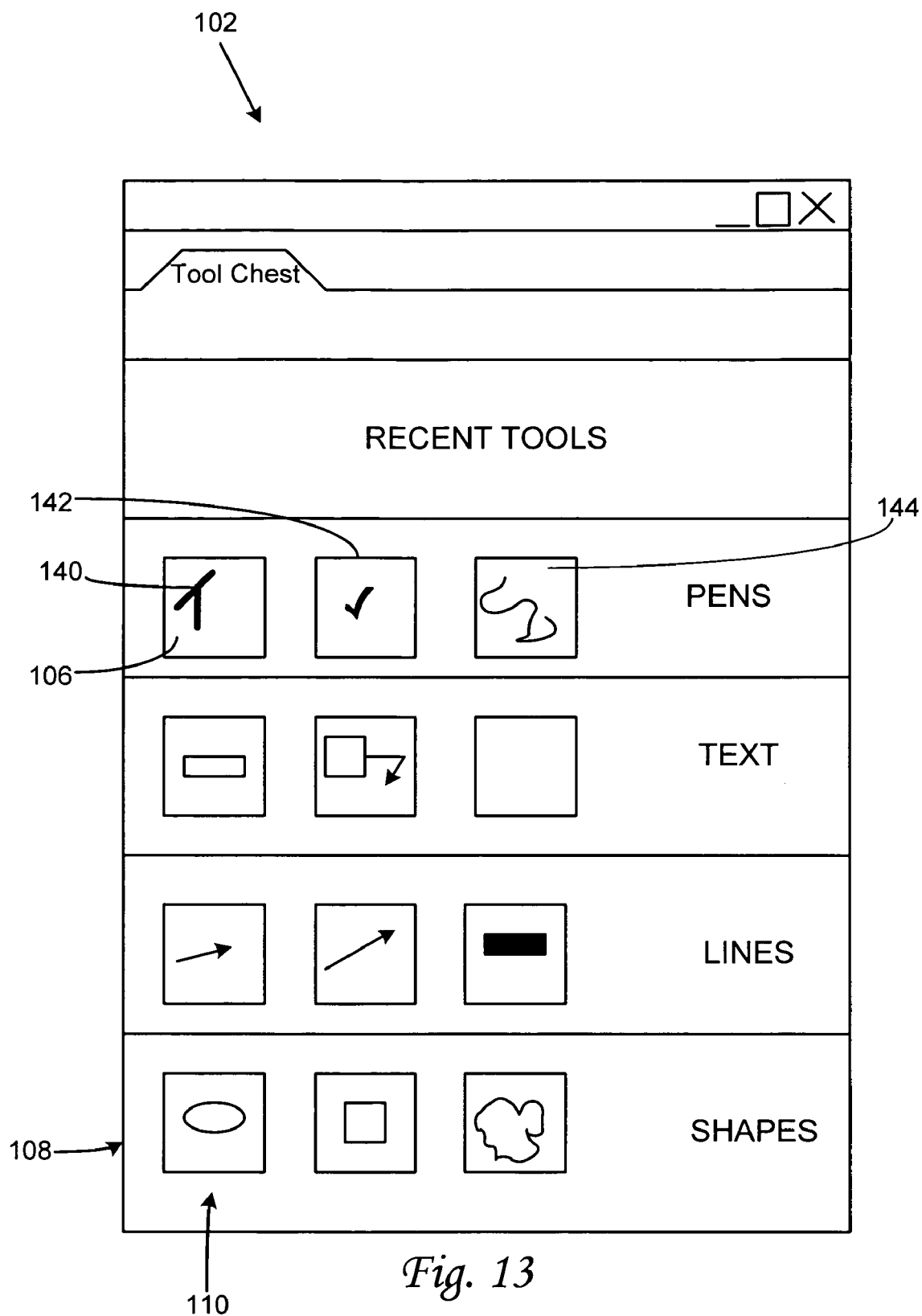
FIG. 13 is a detailed view of a palette window.

With reference to FIGS. 12 and 13, the palette window 102 has the individual cells 106, each containing a thumbnail of a data object stored in the palette memory and organized into the rows 108, and the columns 110. In organizing the rows 108 and the cells 106 contained therein, the tool type attribute 132 of each data object matching a particular tool such as pens, text, lines, shapes and advanced are collected and grouped. Those data objects stored in the palette memory having the tool type attribute 132 of pens are retrieved, and the cells 106 in a top row of the palette window 102 are populated with a first thumbnail 140, a second thumbnail 142, and a third thumbnail 144, respectively. These thumbnails are generated from the retrieved data objects in accordance with the methods described above. In this manner, the other rows 108 of the cells 106 are populated. As a result, each of the data objects stored in the palette memory is grouped into rows according to the tool type attribute 132. These groupings are provided by way of example only and not of limitation, and grouping based on any of the attributes associated with the data objects stored in the palette memory are deemed to be within the scope of the invention.

Figure 14:
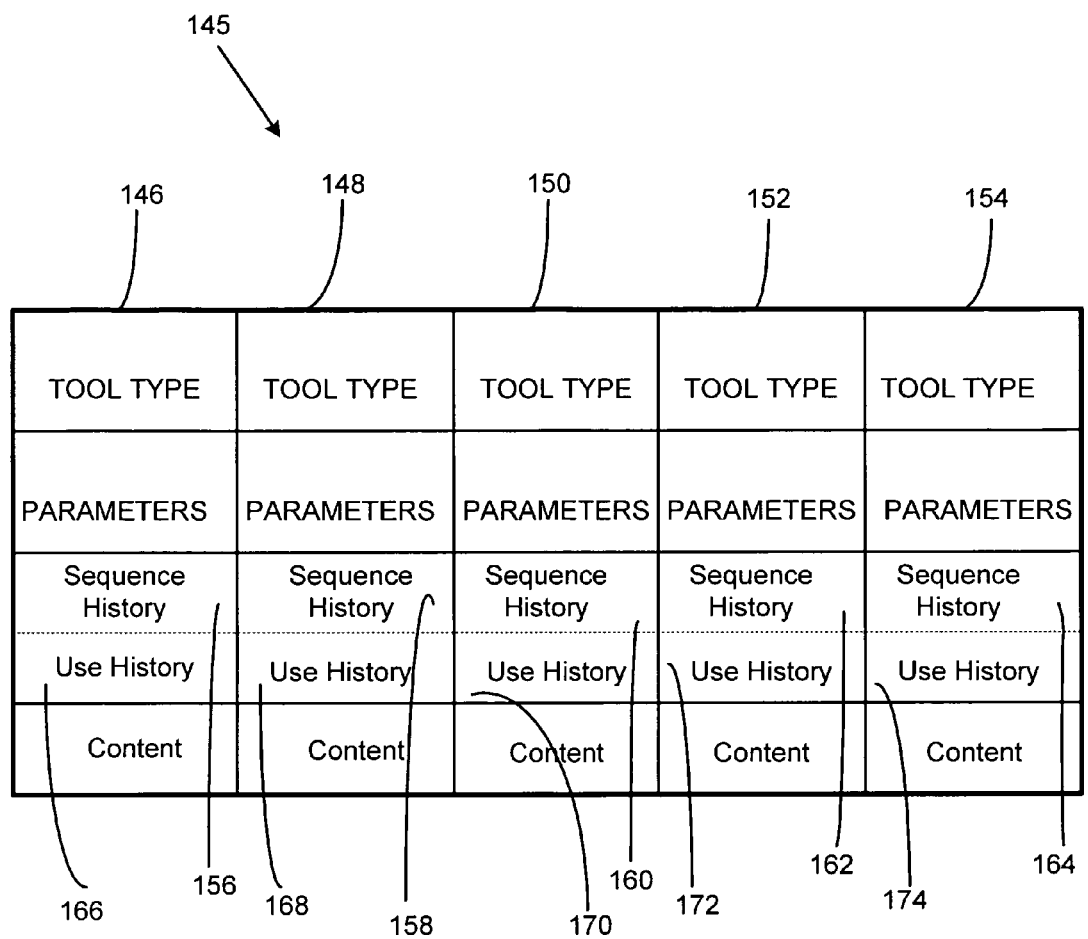
FIG. 14 is a block diagram of a palette memory having particular attributes in accordance with an aspect of the present invention.

As shown in FIG. 13, in this embodiment, only three thumbnails can be displayed per row in the palette window 102. However, it should be noted that as described above, the number of thumbnails displayed may be altered by adjusting the size of the palette window. After grouping the annotations stored in the palette memory as set forth above, a determination must be made of which data objects are to be made available for access via the palette window 102. FIG. 14 illustrates an exemplary palette memory 145 which stores a first data object 146, a second data object 148, a third data object 150, a fourth data object 152, and a fifth data object 155. According to one embodiment, the first data object 146 includes a first sequence history attribute 156, the second data object 148 includes a second sequence history attribute 158, the third data object 150 includes a third sequence history attribute 160, the fourth data object 152 includes a fourth sequence history attribute 162, and the fifth data object 154 includes a fifth sequence history attribute 164. Each of the sequence history attributes stores the order in which the respective data object was stored into the palette memory 145.

For example, if the fifth data object 154 was stored before the fourth annotation 152, then fifth sequence history attribute 164 would be indicated as a "1" while the fourth sequence history attribute 162 would be indicated as a "2." Furthermore, if the third data object 150 was stored after the fourth data object 152 and after the fifth data object 154, the third sequence history attribute 160 would be indicated as a "3," and so forth. Essentially, as new data objects are stored into the palette memory 145, the sequence history attribute of the data object immediately preceding it would be incremented by one and stored as the new sequence history attribute. It will be understood that upon storing each data object as described above, the sequence history of that data object is updated in this manner.

Figure 15:
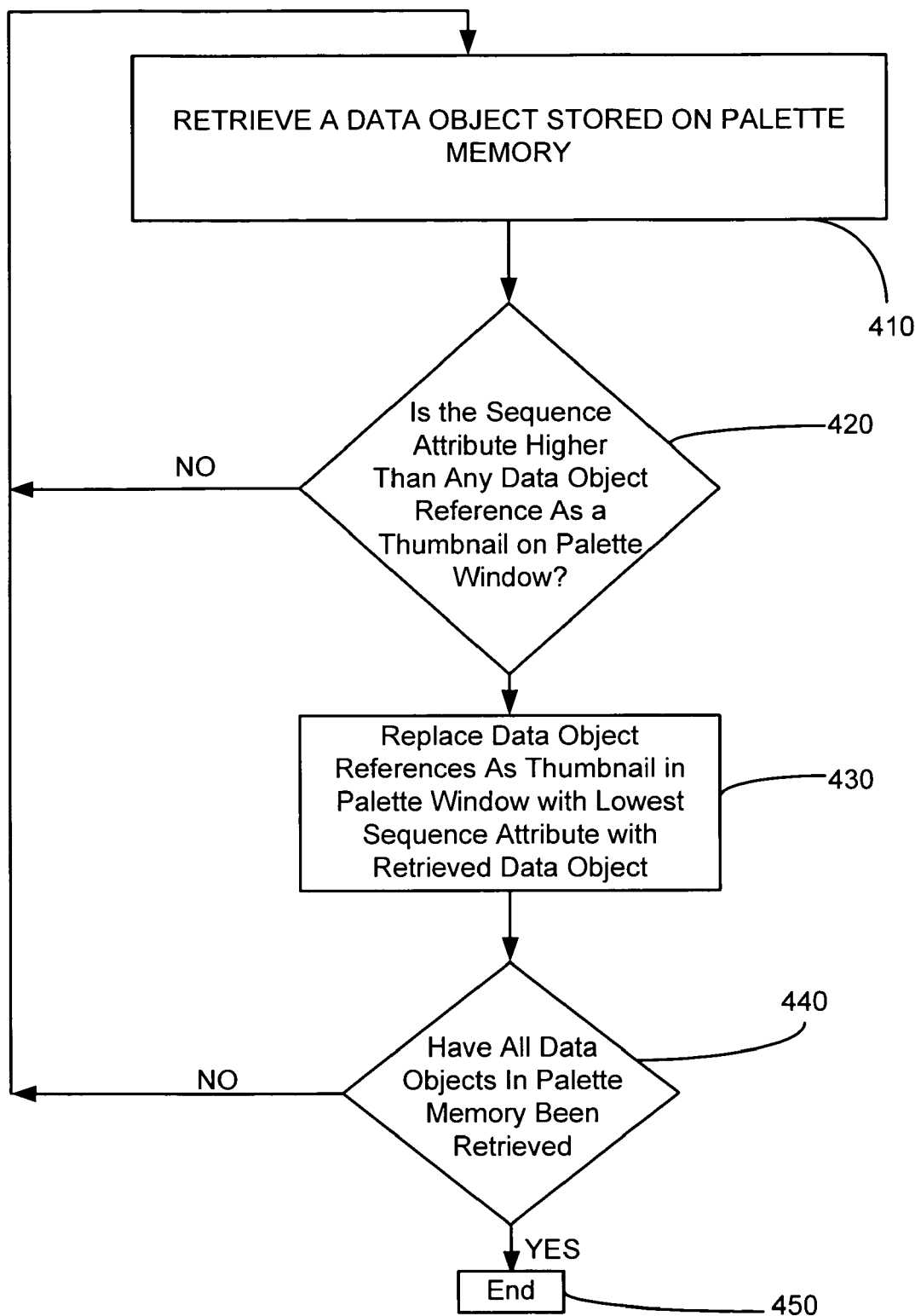
FIG. 15 is a flowchart illustrating the steps taken to organize thumbnails on a palette window in accordance with an aspect of the present invention.

With regard to the determination of which data object to display as a thumbnail in the palette window 102, in the example as set forth above where only three thumbnails are capable of being displayed, only the thumbnails of the data objects having the three highest sequence history attributes will be displayed. Continuing with the example, only the thumbnails of the first data object 146, the second data object 148, and the third data object 150 will be displayed. Thus, with reference to FIG. 15, in a step 410 a preexisting data object stored in the palette memory 145 is retrieved. Then, in accordance with a step 420, the sequence history attribute of the retrieved annotation is compared with the three, if any, annotations currently displayed as a thumbnail in the palette window 102. If the sequence history attribute of the retrieved data object is higher than that of any of the data objects currently being displayed as a thumbnail in the palette window 102, then the data object represented as a thumbnail in the palette window 102 with the lowest sequence attribute is replaced with the retrieved data object according to a step 430. Otherwise, the next data object is retrieved from the palette memory 145. In a step 440, if all of the data objects existing in the palette memory 145 have been processed in this manner, the procedure ends according to a step 450. If not, the next annotation is retrieved from the palette memory 145. While reference has been made to a specific implementation, it will be appreciated by a person having ordinary skill in the art that it is provided by way of example only and not of limitation, and any other method for tracking one data object in relation to another is deemed to be within the scope of the invention.

Additional methods for determining which data objects to display as a thumbnail in the palette window 102 is contemplated as set forth in another embodiment which employs use history attributes 166, 168, 170, 172, and 174. It will be understood that after selecting a particular thumbnail and the corresponding data object is placed within the workspace window 42, the respective use history attribute is incremented. As an example, suppose the first data object 146 had been used fifty times, the second data object 148 had been used ten times, the third data object 150 had been used twice, and the fourth data object 152 had been use five times. Under these circumstances, the first use history attribute 166 will be equal to "50," the second use history attribute 168 will be equal to "10," the third use history attribute 170 will be equal to "2" and the fourth use history attribute 174 will be equal to "5." Only the most frequently used data objects will be represented in the palette window 102. Accordingly, if only three thumbnails may be displayed, the first data object 146 having the corresponding first use history attribute 166 of "50," the second data object 148 having the corresponding second use history attribute 168 of "10," and the fourth data object 152 having the corresponding fourth use history attribute 172 of "5" will be represented as thumbnails in the palette window 102. Furthermore, the thumbnails will be displayed in either ascending or descending order based upon the first, second, and fourth use history attributes 166, 168, and 172. It will be noted that despite third data object 150 being one of the three most recently used, the thumbnail associated with it will not be displayed because it has not been as frequently used as the others.

It will be further understood that in the preferred embodiment, the thumbnails displayed on palette window 102 will be determined in accordance with the application of the sequence history attributes 156, 158, 160, 162, and 164 as set forth above, and sorted within the palette window 102 according to the use of the history attributes 166, 168, 170, 172, and 174 also as set forth above. Additionally, it will be understood that in accordance with the preferred embodiment, all data objects used will be stored in the palette memory 145, with the most frequently used and the most recently used being represented as thumbnails in the palette window 102. In this regard, a library of such frequently used data objects can be developed, retrieved and used across different documents and user sessions.

The particulars shown herein are by way of example and for purposes of illustrative discussion of the embodiments of the present invention only and are presented in the cause of providing what is believed to be the most useful and readily understood description of the principles and conceptual aspects of the present invention. In this regard, no attempt is made to show particulars of the present invention in more detail than is necessary for the fundamental understanding of the present invention, the description taken with the drawings making apparent to those skilled in the art how the several forms of the present invention may be embodied in practice.

What is claimed is:

1. A method of tracking data objects on a data processing device having an output device, the method comprising the steps of:
   storing in a workspace memory a first data object having a plurality of first graphical attributes associated therewith defining the appearance of the first data object;
   storing in a palette memory the first data object when the first graphical attributes are evaluated to not match corresponding graphical attributes of any preexisting data object stored in the palette memory;
   generating on a document displayed in a workspace window the first data object in accordance with the first graphical attributes, the first graphical attributes being editable within the document on the workspace window; and
   generating on a palette window a first thumbnail, the first thumbnail being a depiction of the first data object stored in the palette memory and scaled to a predetermined size, wherein edits made to the first graphical attributes of the first data object in the document are correspondingly reflected in the first thumbnail.

2. The method as set forth in claim 1 wherein the first thumbnail is operative to initiate the generation of the first data object in accordance with the first graphical attributes, the first data object being generated on the workspace window.

3. The method as set forth in claim 1 further comprising the step of:
   generating other thumbnails representative of the preexisting data objects stored in the palette memory, the other thumbnails being generated on the palette window.

4. The method as set forth in claim 3 wherein the first data object includes a tool type attribute and any preexisting data object includes a tool type attribute, the tool type attribute being associated with an appearance characteristic common to all data objects having the same tool type attribute, the method further comprising the step of:
   grouping the first thumbnail and the other thumbnails according to the tool type attribute of the respective ones of data objects stored in the palette memory.

5. The method as set forth in claim 1 wherein the first data object includes a history attribute and any preexisting data object includes a history attribute, the history attribute defining a condition under which the corresponding thumbnail is generated in the palette window.

6. The method for tracking data objects as set forth in claim 5 wherein the history attributes are based upon a sequence of storing the associated data object in the palette memory in relation to the other data objects stored in the palette memory.

7. The method for tracking data objects as set forth in claim 5 wherein the history attributes are based upon a number of times the associated data object was generated on the workspace window.

8. The method for tracking data objects as set forth in claim 5 further comprising the step of:
   generating other thumbnails representative of the preexisting data objects stored in the palette memory, the other thumbnails being generated on the palette window; and sorting the thumbnails according to the history attribute of the respective ones of the first data object and the preexisting data objects.

9. The method for tracking data objects as set forth in claim 1 further comprising the steps of:
storing in the workspace memory a second data object having second graphical attributes; and
storing in the palette memory the second data object where the second graphical attributes are evaluated to not match corresponding graphical attributes of any preexisting data object stored in the palette memory.

10. The method for tracking data objects as set forth in claim 9 wherein the second graphical attributes are derived from the first graphical attributes.

11. The method for tracking data objects as set forth in claim 1 wherein the first data object represents text.

12. The method for tracking data objects as set forth in claim 1 wherein the first data object represents a geometric primitive.

13. The method for tracking data objects as set forth in claim 1 wherein the first data object represents a raster image.

14. The method for tracking data objects as set forth in claim 1, wherein the first data object represents any combination of text, a geometric primitive, and a raster image.

15. A method for using a graphical computer application, the method comprising the steps of:
placing a first data object on a document in a workspace window, the first data object having a plurality of first graphical attributes associated therewith defining the appearance of the first data object on the document; and
selecting a first thumbnail, the first thumbnail being generated on a palette window in response to the placement of the first data object on the document in the workspace window and when the first graphical attributes of the data object on the document are evaluated to not match graphical attributes of any preexisting data object represented as a thumbnail in the palette window, wherein the first thumbnail is a scaled representation of the first data object, the first graphical attributes being editable within the document on the workspace window, and wherein edits made to the first graphical attributes of the first data object on the document are correspondingly reflected in the first thumbnail.

16. The method as set forth in claim 15 wherein the selection of the thumbnail results in a placement in the workspace window a second data object being derived from the first graphical attributes.

17. The method as set forth in claim 16 wherein the second data object is automatically placed in a central region of the workspace window.

18. The method as set forth in claim 16 further comprising the step of:
selecting a placement location within the workspace window for a second data object, the second data object being derived from the first graphical attributes.

19. The method as set forth in claim 18 wherein the placement location is selected by positioning a cursor on the workspace window.

20. The method as set forth in claim 15 further comprising the steps of:
modifying a second data object derived from the first data object on the workspace window, producing a modified second data object; and
selecting a thumbnail generated on the palette window generated in response to modifying the second data object on the workspace window, wherein the thumbnail is a scaled representation of the modified second data object.

21. The method as set forth in claim 15 further comprising the steps of:
modifying the first data object; and
selecting a modified first thumbnail on the palette window, the modified first thumbnail being a scaled representation of the modified first data object.

* * * * *